(12) United States Patent
Schwartz et al.

(10) Patent No.: US 11,635,747 B2
(45) Date of Patent: Apr. 25, 2023

(54) SYSTEM AND METHOD FOR GENERATING FABRICATION PARAMETERS OF A PART TO BE FABRICATED

(71) Applicant: DESPREZ LLC, New London, NH (US)

(72) Inventors: Jonathan Schwartz, New York City, NY (US); Max Friefeld, New York City, NY (US); Oliver Ortlieb, New York City, NY (US)

(73) Assignee: DESPREZ, LLC, New London, NH (US)

( * ) Notice: Subject to any disclaimer, the term of this patent is extended or adjusted under 35 U.S.C. 154(b) by 0 days.

(21) Appl. No.: 17/130,962

(22) Filed: Dec. 22, 2020

(65) Prior Publication Data

US 2021/0149367 A1 May 20, 2021

Related U.S. Application Data

(63) Continuation of application No. 15/796,088, filed on Oct. 27, 2017, now Pat. No. 10,908,588.

(Continued)

(51) Int. Cl.
*G06F 19/00* (2018.01)
*G05B 19/4099* (2006.01)
(Continued)

(52) U.S. Cl.
CPC ........ *G05B 19/4099* (2013.01); *B29C 64/393* (2017.08); *B33Y 50/02* (2014.12);
(Continued)

(58) Field of Classification Search
CPC ..... B29C 64/386; B29C 64/393; B33Y 50/00; B33Y 50/02; G05B 19/4063;
(Continued)

(56) References Cited

U.S. PATENT DOCUMENTS 8,226,395 B2 7/2012 Pax et al.
2004/0103093 A1* 5/2004 Furuhashi ............. G06F 16/583
707/E17.02

(Continued)

FOREIGN PATENT DOCUMENTS

CN 104203547 A 12/2014
JP 2015179315 A * 10/2015
(Continued)

OTHER PUBLICATIONS

International Search Report; PCT/IB2017/056703; dated Sep. 20, 2018.

*Primary Examiner* — Zhipeng Wang
(74) *Attorney, Agent, or Firm* — Caldwell Intellectual Property Law

(57) ABSTRACT

A method for generating a quote for fabrication of a part to be fabricated includes receiving, from a customer device associated with a customer, a design request for a part to be fabricated by a fabrication process, the design request including a two-dimensional drawing file representing the part to be fabricated and descriptive information including a descriptive datum. The method includes extracting a first feature from the 2D drawing file, wherein the first feature represents a geometry of the part to be fabricated. The method includes extracting a second feature from the descriptive information, wherein the second feature represents the descriptive datum. The method includes generating, as a function of the first and second features, a quote for fabrication for the part to be fabricated, the quote for fabrication including a cost and time to fabricate the part to be fabricated and sending the quote for fabrication to the customer.

20 Claims, 17 Drawing Sheets

Related U.S. Application Data

(60) Provisional application No. 62/413,692, filed on Oct. 27, 2016.

(51) Int. Cl.

| | | |
|---|---|---|
| *B33Y 50/02* | (2015.01) | |
| *B29C 64/393* | (2017.01) | |
| *G05B 19/4063* | (2006.01) | |
| *G05B 19/418* | (2006.01) | |
| *B33Y 50/00* | (2015.01) | |
| *B29C 64/386* | (2017.01) | |

(52) U.S. Cl.
CPC ........ *G05B 19/4063* (2013.01); *B29C 64/386* (2017.08); *B33Y 50/00* (2014.12); *G05B 19/41865* (2013.01); *G05B 2219/35134* (2013.01); *G05B 2219/35161* (2013.01); *G05B 2219/35214* (2013.01); *G05B 2219/49004* (2013.01); *G05B 2219/49005* (2013.01); *G05B 2219/49007* (2013.01); *Y02P 90/02* (2015.11)

(58) Field of Classification Search
CPC .......... G05B 19/4099; G05B 19/41865; G05B 2219/35134; G05B 2219/35161; G05B 2219/35214; G05B 2219/49004; G05B 2219/49005; G05B 2219/49007; Y02P 90/18; Y02P 90/20; Y02P 90/265
See application file for complete search history.

(56) References Cited

U.S. PATENT DOCUMENTS

| | | | | |
|---|---|---|---|---|
| 2009/0271323 A1* | 10/2009 | Zinniel | .................. | G06Q 30/04 |
| | | | | 705/26.1 |
| 2013/0297320 A1* | 11/2013 | Buser | .................... | B29C 64/118 |
| | | | | 704/E21.001 |
| 2013/0329258 A1* | 12/2013 | Pettis | ..................... | F16M 11/18 |
| | | | | 358/1.15 |
| 2014/0042670 A1* | 2/2014 | Pettis | .................... | B29C 64/393 |
| | | | | 264/401 |
| 2014/0117585 A1* | 5/2014 | Douglas | ................ | B29C 64/386 |
| | | | | 264/401 |
| 2014/0156053 A1 | 6/2014 | Mahdavi et al. | | |
| 2014/0279177 A1* | 9/2014 | Stump | ................ | G06Q 30/0611 |
| | | | | 705/26.4 |
| 2015/0036174 A1* | 2/2015 | Pettis | .................... | G06F 3/1288 |
| | | | | 358/1.15 |
| 2015/0178321 A1* | 6/2015 | Rivlin | ................... | G06F 16/532 |
| | | | | 707/728 |
| 2015/0197060 A1 | 7/2015 | Carr et al. | | |
| 2016/0005097 A1* | 1/2016 | Hsiao | ................. | G06Q 30/0631 |
| | | | | 705/26.7 |
| 2016/0054726 A1* | 2/2016 | Yoo | ..................... | G05B 19/4099 |
| | | | | 700/118 |
| 2016/0086258 A1* | 3/2016 | Romes | ................. | B29C 64/393 |
| | | | | 705/27.1 |
| 2016/0107380 A1 | 4/2016 | Smoot et al. | | |
| 2016/0185044 A1* | 6/2016 | Leonard | ................ | G05B 15/02 |
| | | | | 700/98 |
| 2016/0250810 A1* | 9/2016 | Lynch August | ... | G05B 19/4099 |
| | | | | 700/98 |
| 2016/0274572 A1* | 9/2016 | Littrell | ..................... | G06F 30/00 |
| 2017/0113412 A1* | 4/2017 | Adams | ............... | G05B 19/4099 |
| 2017/0161590 A1* | 6/2017 | Boulkenafed | ........ | G06K 9/6269 |
| 2018/0046167 A1* | 2/2018 | Iverson | ............. | G05B 19/4099 |
| 2018/0099460 A1* | 4/2018 | Iverson | .................. | B33Y 50/02 |
| 2018/0107902 A1* | 4/2018 | Yang | .................. | G06F 16/532 |

FOREIGN PATENT DOCUMENTS

| | | |
|---|---|---|
| WO | 2016088118 A1 | 6/2016 |
| WO | 2016150409 A1 | 9/2016 |

\* cited by examiner

SYSTEM AND METHOD FOR GENERATING FABRICATION PARAMETERS OF A PART TO BE FABRICATED

CROSS-REFERENCE TO RELATED APPLICATION

This application is a continuation of U.S. Nonprovisional application Ser. No. 15/796,088, filed on Oct. 27, 2017 titled "AUTOMATED CONFIGURATION OF PRINTER SETTINGS", which is hereby incorporated by reference in its entirety, which in turn claims the benefit of U.S. Provisional Application No. 62/413,692, filed Oct. 27, 2016, which is hereby incorporated by reference in its entirety.

TECHNICAL FIELD

This disclosure relates generally to manufacturing systems and more particularly to a system that facilitates design of a part to be manufactured.

BACKGROUND

Traditional fabrication methods use one or more reusable template components to shape many identical copies of a part. For example, injection molding forms plastic parts within a reusable mold that defines the exterior surface of each part. Although template components enable economical manufacturing of each part, the template component itself is expensive to manufacture because it must be durable enough to shape many (often thousands) of parts. Thus, template components add overhead costs to traditional forming methods.

To alleviate the overhead costs of traditional forming methods, additive manufacturing methods may be used to form parts without template components. For example, three-dimensional (3D) printing techniques form parts by sequentially depositing the layers of a part. Additive manufacturing methods can thus reduce overhead costs by obviating the need for template components. However, additive manufacturing still entails overhead costs such as labor to configure manufacturing settings. In 3D printing, a part may be oriented in one of several directions that affect the number and size of printed layers. Where parts are small enough for a 3D printer to print multiple copies simultaneously, the part orientation also affects the number of copies the 3D printer may print at a time. Additionally, the part orientation influences the amount and shape of auxiliary material used to support overhanging surfaces of the part. These numerous interconnected factors that influence manufacturing settings necessitate skilled labor that adds to overhead costs of additive manufacturing.

SUMMARY

In an aspect, a method for generating a quote for fabrication of a part to be fabricated includes receiving, from a customer device associated with a customer, a design request for a part to be fabricated by a fabrication process, the design request including a two-dimensional (2D) drawing file representing the part to be fabricated and descriptive information including a descriptive datum. The method includes extracting a first feature from the 2D drawing file, wherein the first feature represents a geometry of the part to be fabricated. The method includes extracting a second feature from the descriptive information, wherein the second feature represents the descriptive datum. The method includes generating, as a function of the first and second features, a quote for fabrication for the part to be fabricated, the quote for fabrication including a cost and time to fabricate the part to be fabricated and sending the quote for fabrication to the customer.

A system for generating a quote for fabrication of a part to be fabricated including a computing device configured to receive, from a customer device associated with a customer, a design request for a part to be fabricated by a fabrication process, the design request including a two-dimensional (2D) drawing file representing the part to be fabricated and descriptive information including a descriptive datum. The computing device is configured to extract a first feature from the 2D drawing file, wherein the first feature represents a geometry of the part to be fabricated and extract a second feature from the descriptive information, wherein the second feature represents the descriptive datum of the part to be fabricated. The system includes a quote generator operating on the computing device, the quote generator configured to generate, as a function of the first and second feature, a quote for fabrication for the part to be fabricated, the quote for fabrication including a cost and time to fabricate the part to be fabricated and send the quote for fabrication to the customer.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

FIGS. 3A-3D are example screenshots of a customer interface provided by the factory server, according to one embodiment;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

System Environment

Figure 1:
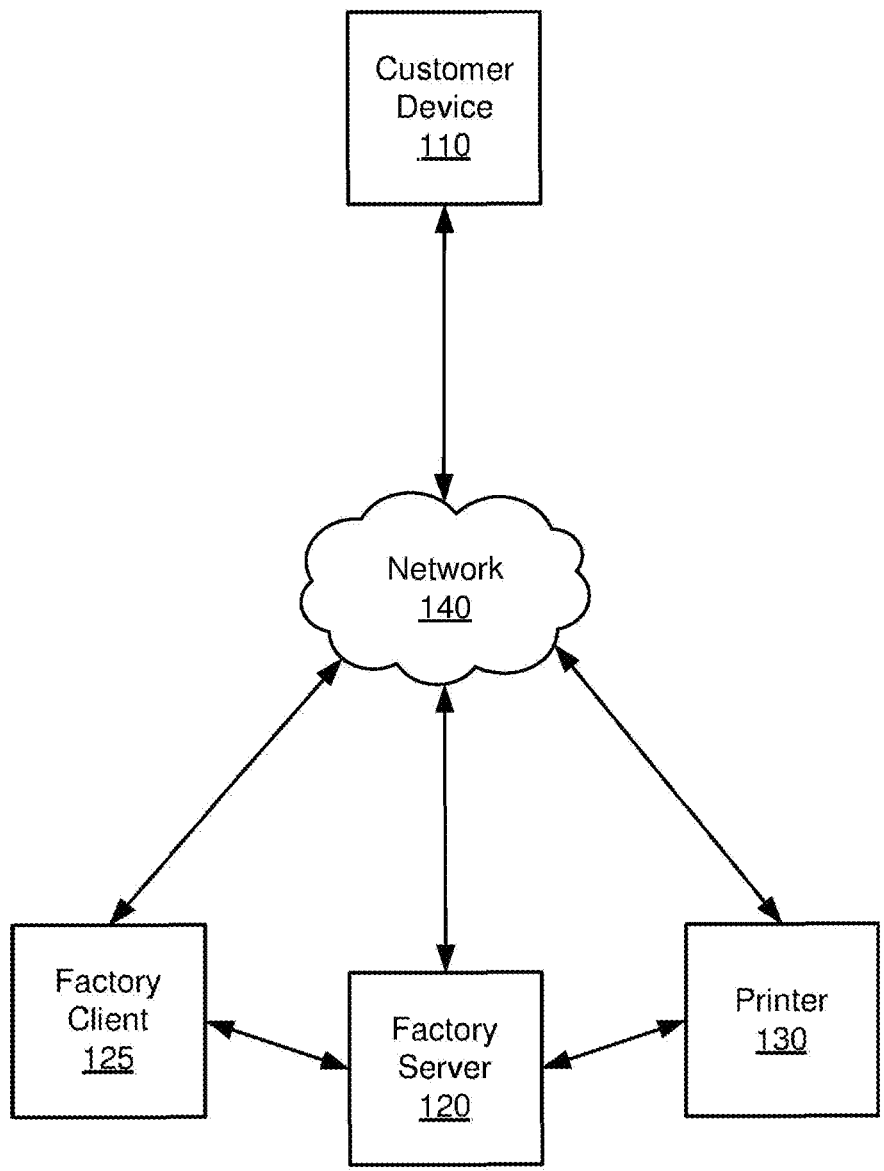
FIG. 1 is a block diagram of an example automated manufacturing environment, according to one embodiment.

FIG. 1 is a block diagram of an example automated manufacturing environment 100, according to one embodiment. The automated manufacturing environment 100 contains entities including one or more customer devices 110, factory servers 120, factory clients 125, and printers 130 interconnected by one or more networks 140. The one or more customer devices 110, factory servers 120, and factory clients 125 may be implemented as computer systems, such as the computer system 1000 shown in FIG. 10. The manufacturing environment 100 may include other manufacturing tools in addition to or as an alternative to the one or more printers 130. One or more of the entities (e.g., customer device 110, factory client 125) may be omitted.

A customer uses a customer device 110 to interact with factory server 120 through a customer interface 205. For example, the customer interface 205 enables the customer to request parts and monitor their status through fabrication and delivery. In various embodiments, the customer interface 205 may be implemented as a web-based interface provided by the factory server 120 and accessible via a web browser application on the customer device 110, a user interface in a native application executing on the customer device 110, some combination of the two (e.g., a WebView object within a native application), or some other type of interface that is accessible on the customer device 110. The customer device 110 may be any computer able to present the customer interface and accept customer inputs through the customer interface. Example customer devices 110 include a desktop computer, a laptop computer, a tablet computer, or a mobile device (e.g., a smartphone). A customer device may present the customer interface through, for example, a display such as a screen or projector and/or through an audio device such as speakers or headphones. A customer device 110 may accept inputs through one or more input devices such as, for example, a keyboard, mouse, pointer, touch screen, or microphone.

A factory server 120 controls one or more printers 130, other manufacturing tools, or both. The factory server 120 provides one or more interfaces enabling initiation, monitoring, and modification of the manufacturing process. For example, the factory server 120 provides a customer interface for presentation to customers by customer device 110, a factory interface for presentation to operators by factory client 125, or both.

A customer interacts with the customer interface to complete a part request specifying attributes of one or more parts to be manufactured. As referred to herein, a part request is a request submitted by a customer In one example implementation, a part request includes a three dimensional (3D) model file of the part, model scale information (e.g., a distance unit), customer contact information, a requested deadline, a part material, a part color, and a quantity of the part. As another example, a part request further includes an image to be fixed on a surface of the finished part. As a third example, the part request omits a model file and instead includes descriptive information, such as a written description, images, videos, or a combination thereof, depicting the customer's conception of a requested part. In this third example, the part request may alternatively be referred to as a design request, and a factory operator such as a designer or artist may review the design request and convert the descriptive information of the part into a model file for use in manufacturing.

The factory server 120 converts model files specifying a part's geometry, which are irrespective of manufacturing tool, into manufacturing instructions usable by a particular type of manufacturing tool (e.g., printer 130) to fabricate the part. The model file may be a three-dimensional (3D) model specifying the geometrical layout of a part using, for example, a mesh, surfaces, vectors, or a combination thereof. The manufacturing instructions (e.g., G-code) are readable by the manufacturing tool (or an operator thereof) and are specified in terms of elementary operations to at least partially fabricate the part. In the example of 3D printing, the manufacturing instructions specify positions for a tool head to extrude material for sequentially fabricating a part's layers.

Conversion of the model file to manufacturing instructions depends at least in part on manufacturing settings. Manufacturing settings depend on the type of manufacturing tool (e.g., the type of printer 130) and may be specified at least in part by a customer's part request. For example, the part request specifies one or more colors for the part as well as a material (e.g., plastic, rubber, metal) for the part. The factory server 120 may configure manufacturing settings for manufacturing a part specified by a model file. Configuring manufacturing settings includes the factory server 120 determining tool-specific manufacturing settings that correspond to tool properties of a particular manufacturing tool. For example, the factory server 120 uses the tool properties of printer 130 such as build volume, build volume dimensions, build plate dimensions, or print resolution to determine tool-specific manufacturing settings such as print layer thickness, print orientation, or plate layout. The factory server 120 is described in further detail with respect to FIG. 2.

A factory operator uses factory client 125 to interact with factory server 120 through a factory interface. For example, the factory interface enables the factory operator to review order status, configure manufacturing settings (e.g., part orientation, print layout on build plate), monitor the status of a manufacturing tool (e.g., printer 130), generate or modify a design file to fulfill a customer request, or a combination thereof. The factory client 125 may be a computer device similar to those described with respect to the customer device 110.

The printer 130 is a manufacturing tool that fabricates a part using additive manufacturing techniques such as fused deposition modeling, stereolithography, laser sintering, or laser melting. The printer may fabricate a part using one or more materials including plastic, rubber, metal, other materials, or a combination thereof. An example printer 130 includes a build plate that supports the base (e.g., top, bottom, side); one or more directional tools to control formation of the part; and an actuator to move the build plate relative to the directional tools or vice versa. For example, in fused deposition modeling, the directional tool includes a nozzle that extrudes material onto a portion of the part. In stereolithography, an example directional tool includes a laser and one or more mirrors directing the laser onto a portion of the part. Another example directional tool in stereolithography is a projector forming a variable pattern on the part. The printer 130 uses manufacturing instructions from factory server 120 to fabricate one or more parts.

The manufacturing environment 100 may include other manufacturing tools communicatively coupled to the factory server 120. For example, such manufacturing tools include surface printers or subtractive manufacturing tools (e.g., computer numerical control (CNC) lathes, mills, saws, or laser cutters).

Factory Server

Figure 2:
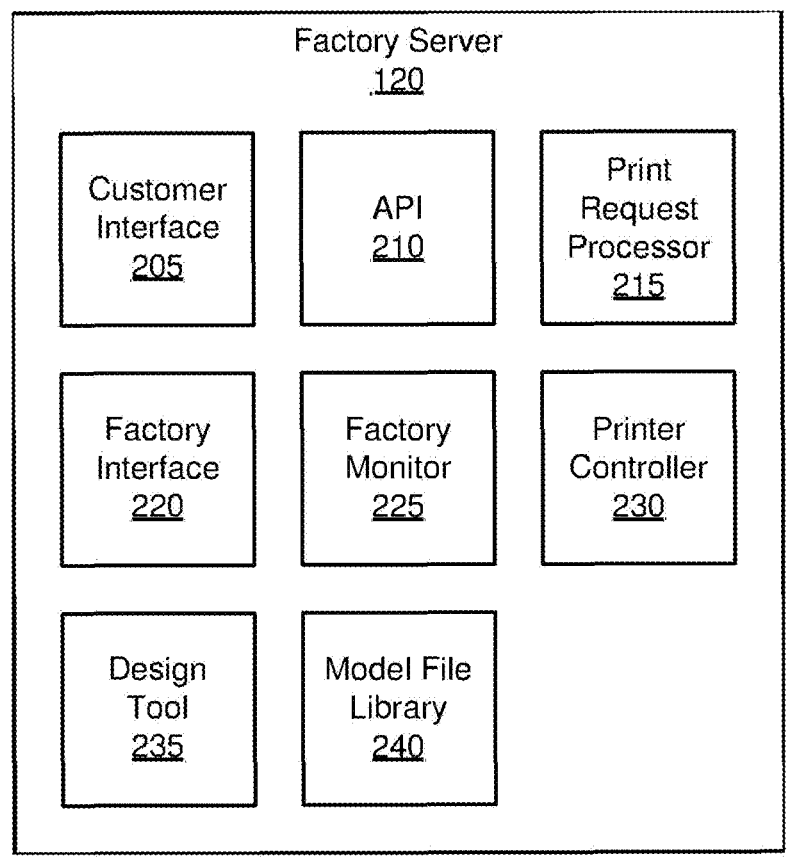
FIG. 2 is a block diagram of an example factory server, according to one embodiment.

FIG. 2 is a block diagram of an example factory server 120, according to one embodiment. The factory server 120 may include a non-transitory, computer-readable storage medium (i.e., a memory) storing the computer program instructions and one or more processors for executing the computer program instructions to cause the factory server 120 to perform functionality associated with the program modules. For example, the memory includes one or more read-access memories, flash memories, or hard disk memories, or a combination thereof; and the processor includes one or more central processing units (CPUs), graphics processing units (GPUs), application-specific integrated circuits (ASICs), or a combination thereof. The memory may include other technologies, such as a quantum memory storing photonic quantum information. The factory server 120 may include one or more servers operated at one or more locations. In some embodiments, the factory server 120 uses cloud computing services.

The factory server 120 includes computer program instructions for program modules including a customer interface 205, an application programming interface (API) 210, a print request processor 215, a factory interface 220, a factory monitor 225, a printer controller 230, a design tool 235, and a model file library 240. The factory server 120 may include fewer or additional modules performing different functionality, or a different combination of modules to perform similar functionality. In some implementations, the factory server 120 includes multiple servers or other computers performing different subsets of the functionality described with respect to the example factory server 120.

The customer interface 205 enables a customer to place part requests with the factory server 120. The customer interface 205 presents fields to request parameters of the part request from a user, which the customer interface 205 sends to the factory server 120 through API 210. In some implementations, a customer may directly interact with the factory server 120 through the API 210 without using the customer interface. Additionally, the customer interface 205 presents information (e.g., estimated part price, estimated completion date) queried from the factory server 120 using the API 210. In some embodiments, the customer interface is a web page containing instructions for a browser of the customer device 110 to present the customer interface. In some embodiments, the customer interface is an application native to an operating system of the customer device 110.

Figure 3A:
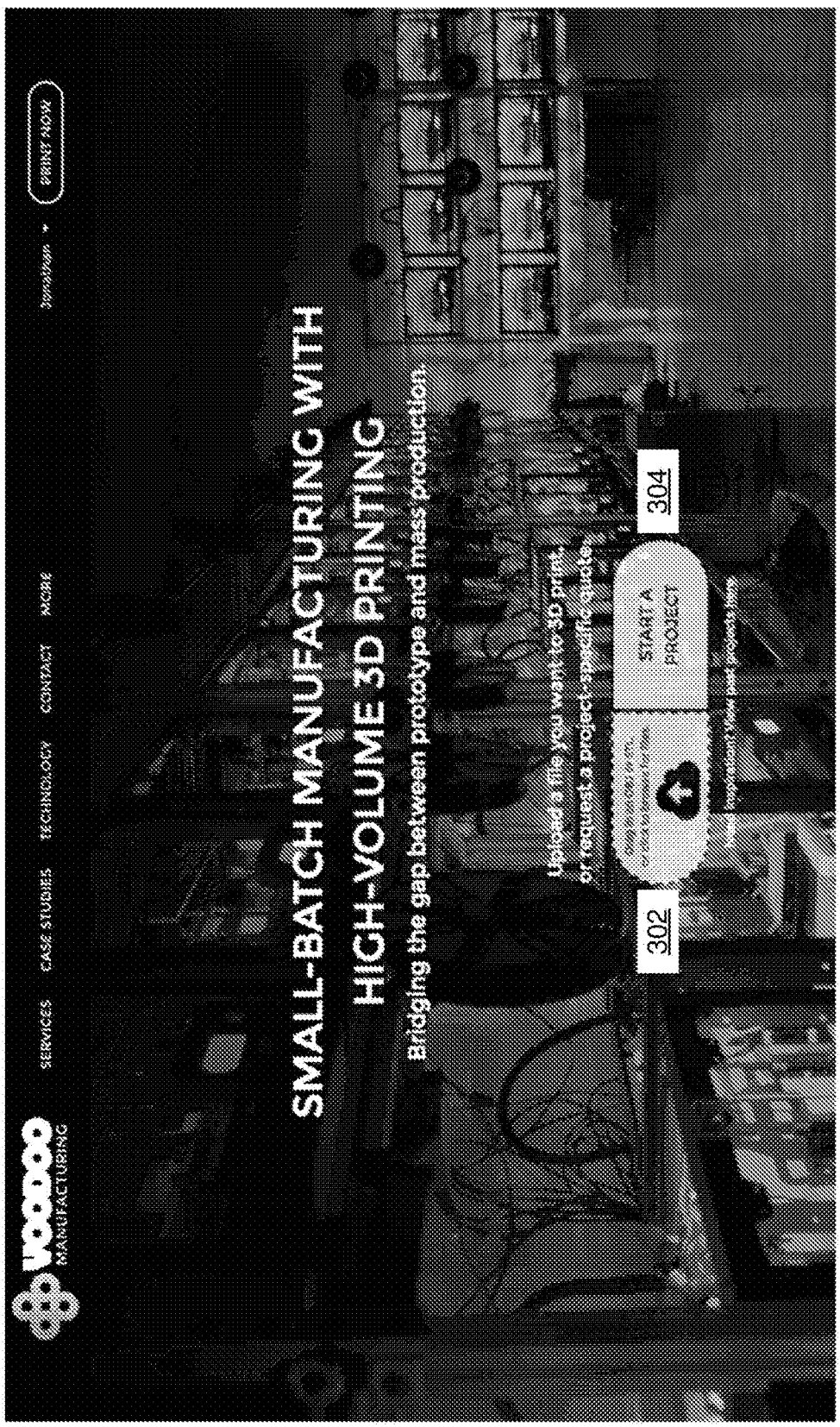

In one configuration, the customer interface 205 offers two modes for customers to place part requests: (1) direct print and (2) quotation request. An example of such a configuration is illustrated in FIG. 3A, which presents a customer with a first option 302 to upload a file for direct printing and a second option 304 to request a quote for a project.

Figure 3B:
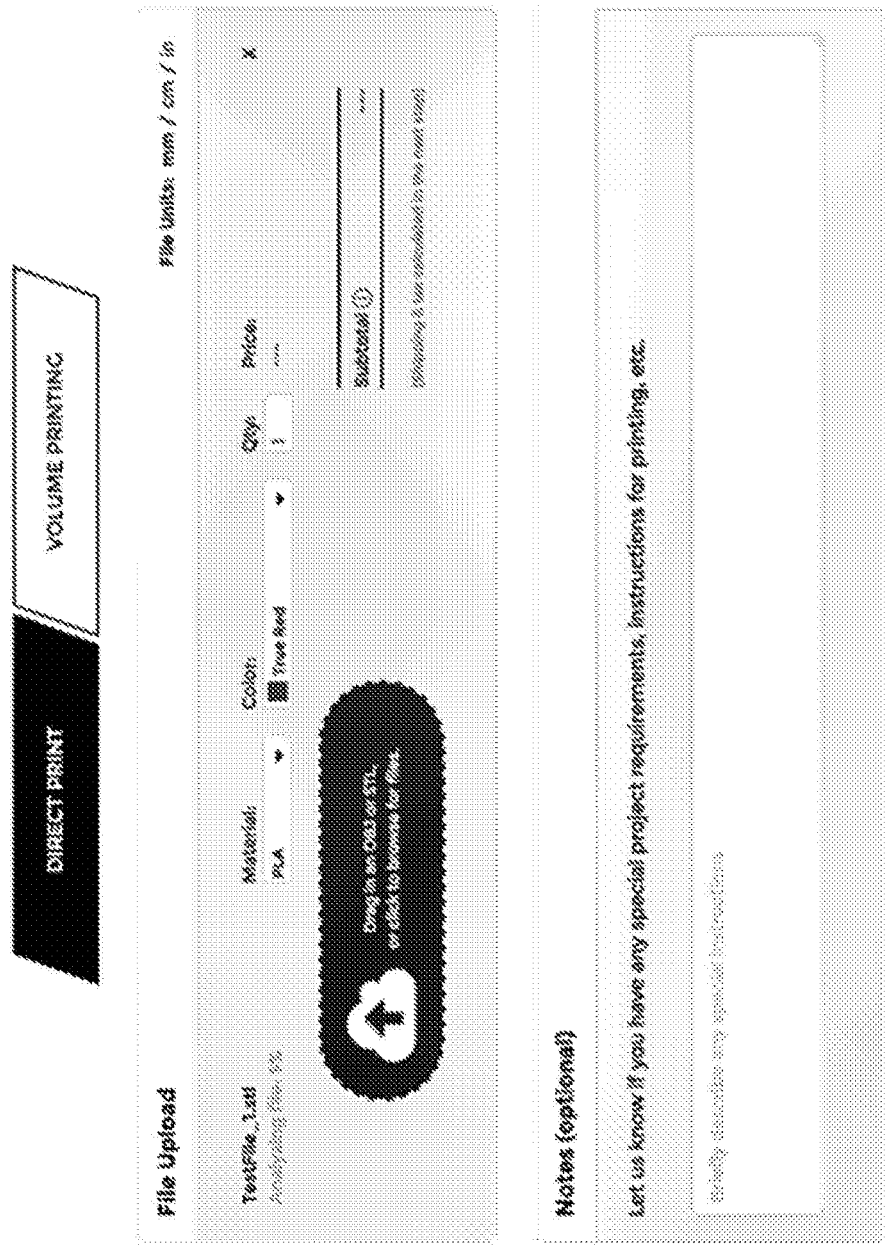
Figure 3C:
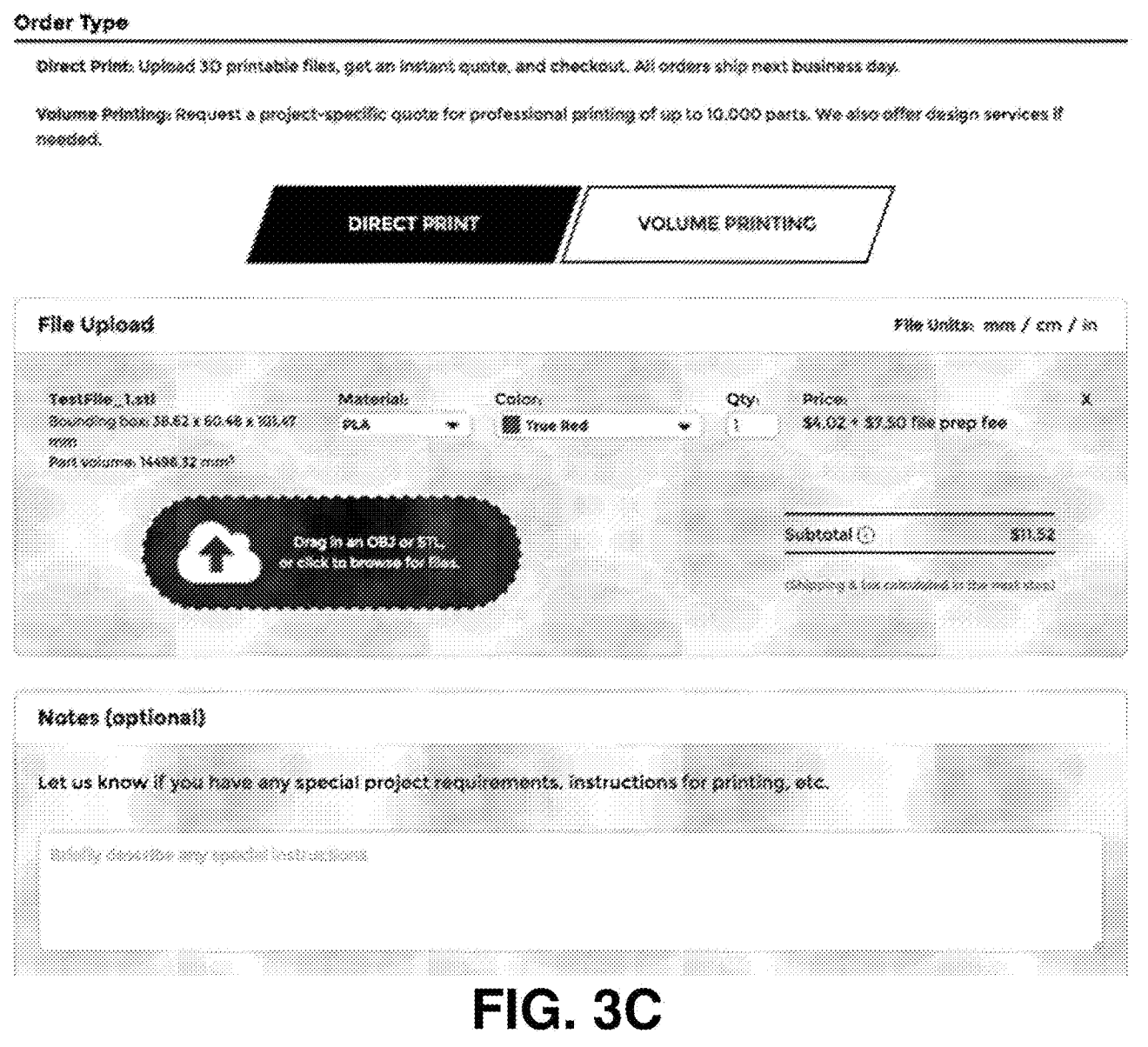

In the direct print mode, the customer interface 205 accepts request parameters including one or more of customer contact information, a model file, model file scale (e.g., distance units), part quantity, part color, and part material. The customer interface 205 queries the factory server 120 for an order price based at least in part on the estimated amount of material used, expected print time, number of parts, or a combination thereof. The amount of material used may be estimated from part surface area, part volume, dimensions of a rectangular prism bounding the part, print resolution, other print settings, or a combination thereof. The order price is presented to the customer in the customer interface. The factory server 120 may select manufacturing tools to complete the order, determine manufacturing settings, generate manufacturing instructions, and initiate fabrication of the part using the selected manufacturing tools. In some instances, this process may be completed without intervention by a factory operator. FIG. 3B illustrates the customer interface 205 in direct print mode before request parameters are submitted to the factory server 120. FIG. 3C illustrates the customer interface 205 in direct print mode after the factory server 120 sends the estimated order price to the customer device 110.

Figure 3D:
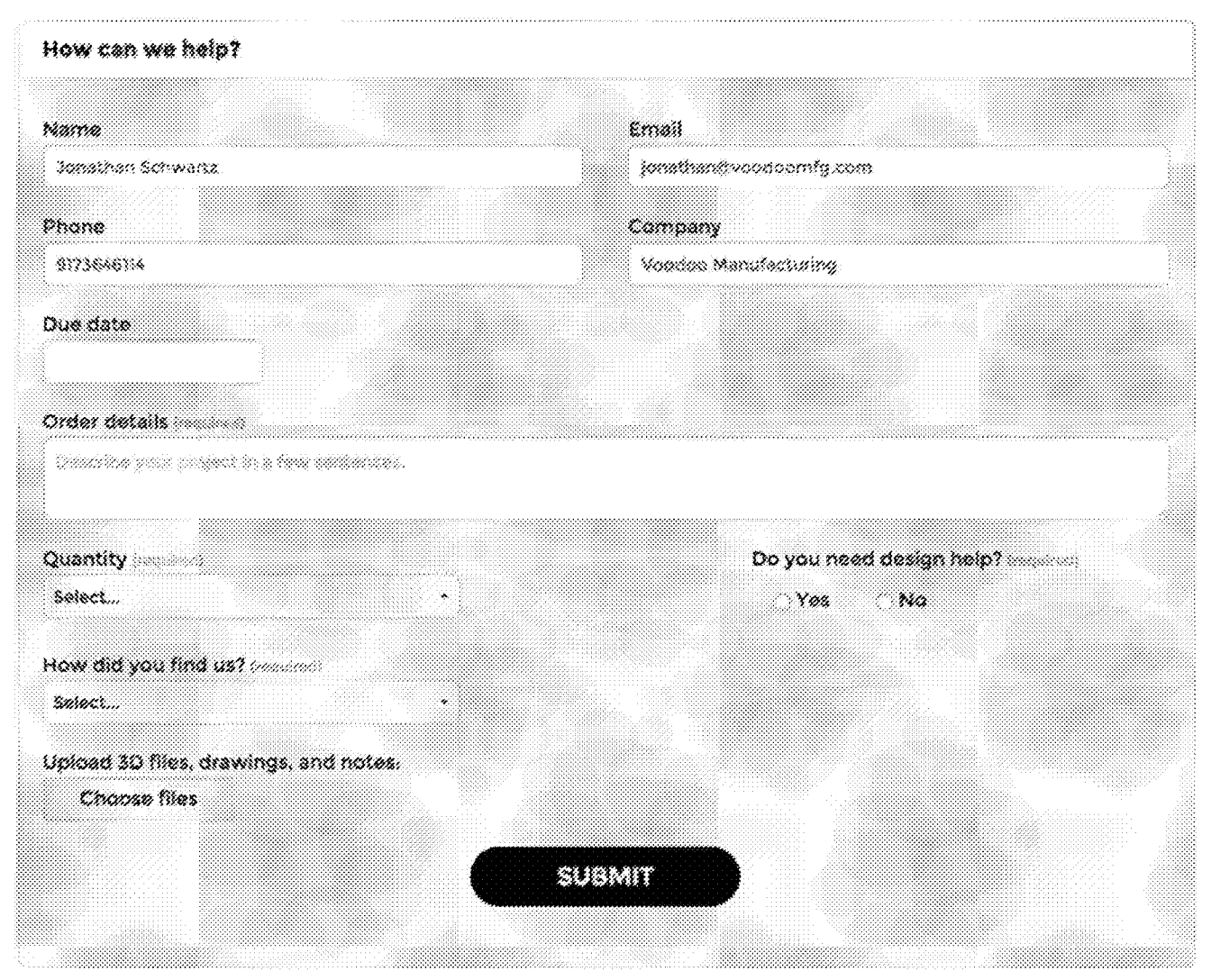

In the quotation request mode, the customer interface 205 accepts one or more of the request parameters used in direct print mode as well as custom instructions. However, the factory server 120 generally holds fulfilment of such a part request until further consultation with the customer to confirm order price, delivery date, or the custom instructions. FIG. 3D illustrates the customer interface in quotation request mode.

In one embodiment, the customer interface 205 facilitates "five-dimensional (5D) printing," where a 3D part is fabricated and finished by applying one or more images (e.g., two-dimensional (2D) images) to a surface of the 3D part. Using the customer interface 205, the customer may upload a model file of the part as described above, and further upload one or more images for application onto the part. The customer interface 205 may enable the user to orient and place the image on a graphical model of the part generated based on the part file. Production of the "5D part" is described further with respect to FIG. 8.

Figure 5:
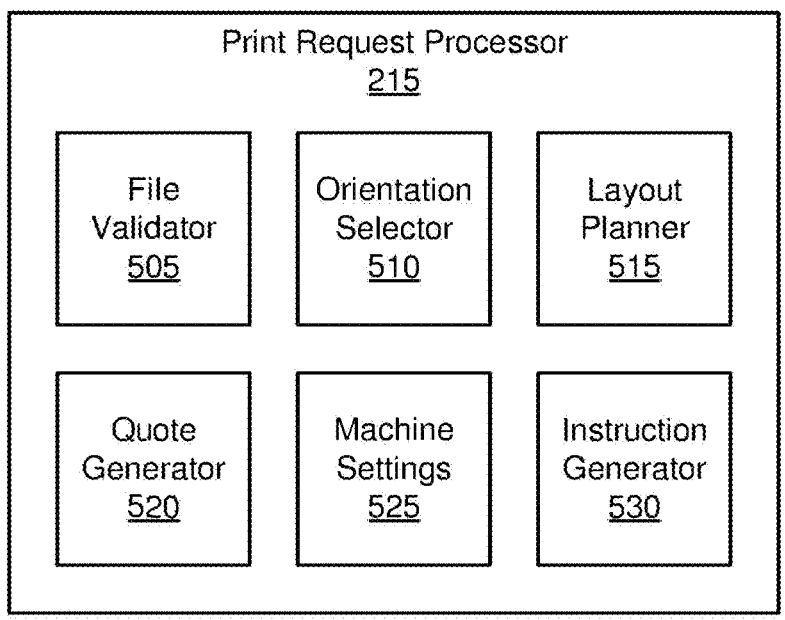
FIG. 5 is a block diagram of a print request processor, according to one embodiment.

The print request processor 215 determines print settings and is described further with respect to FIG. 5.

Figure 4A:
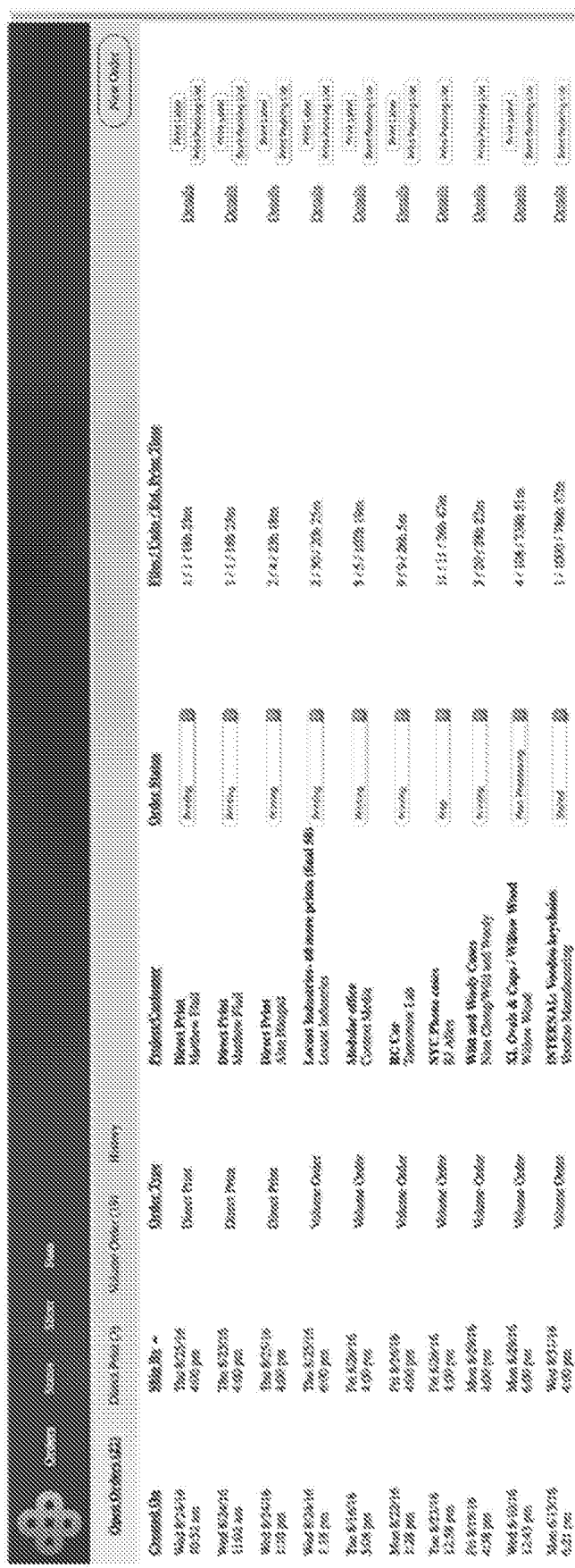
FIGS. 4A-4E are example screenshots of a factory interface provided by the factory server, according to one embodiment.
Figure 4B:
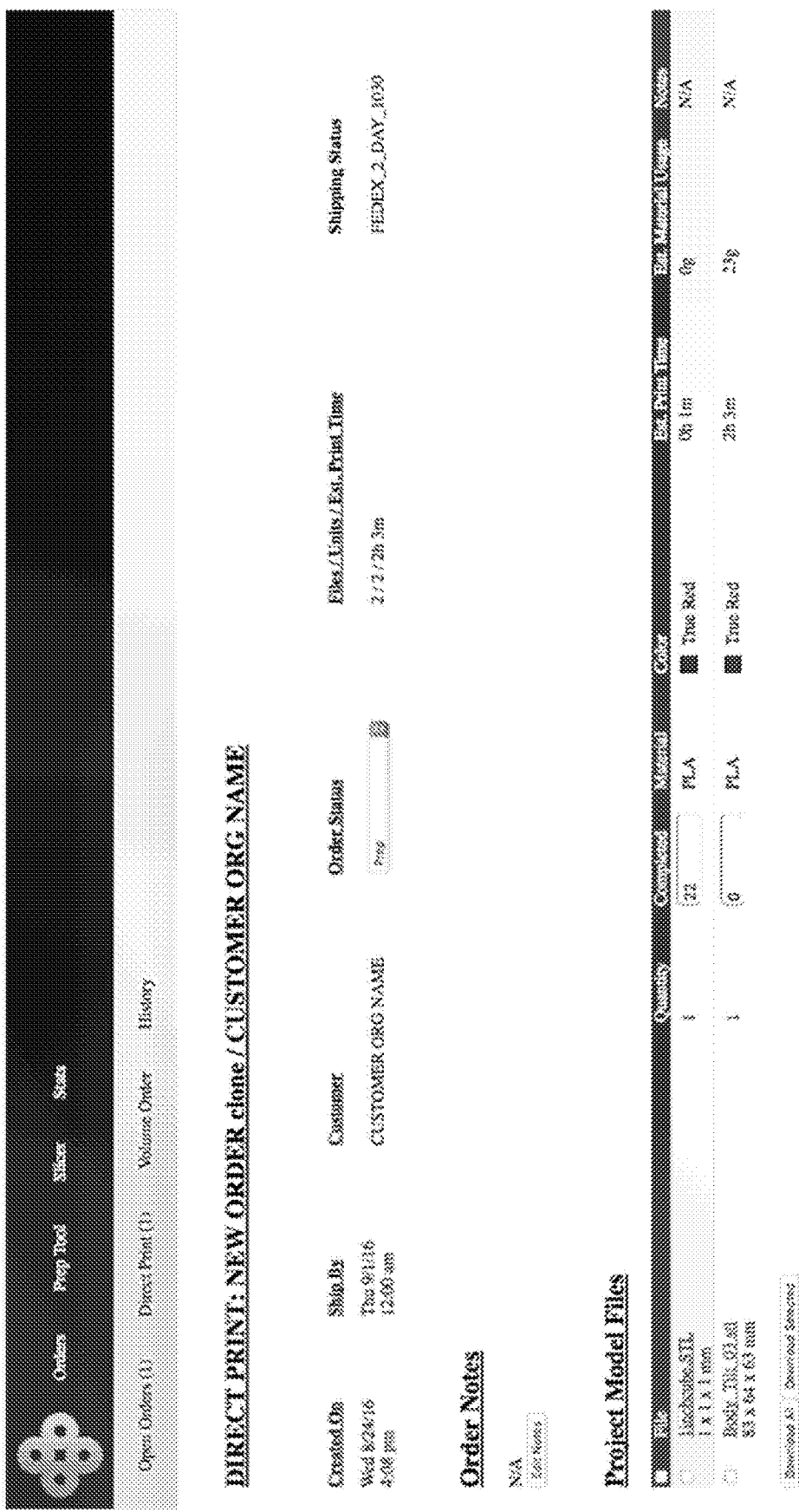
Figure 4C:
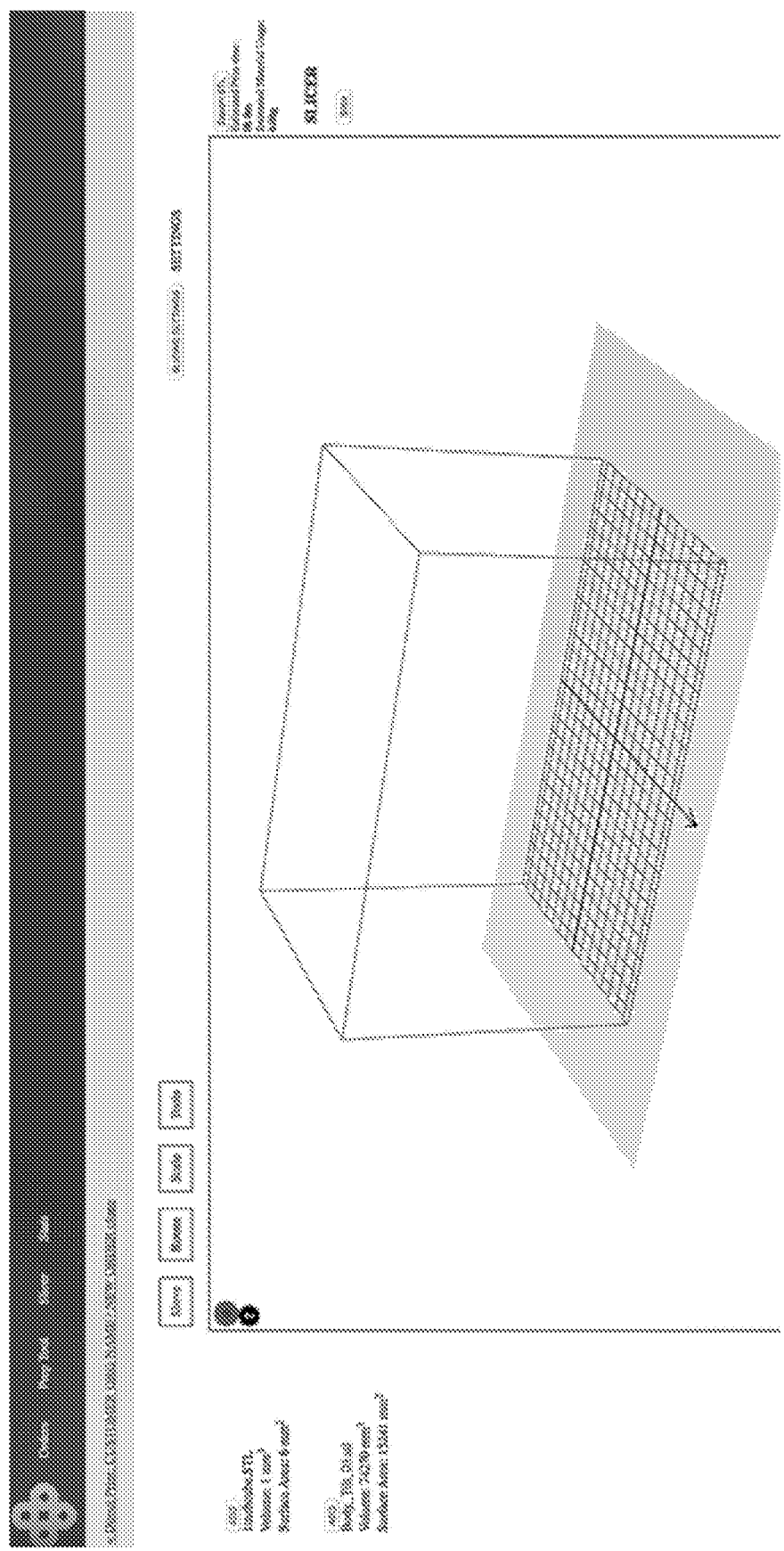
Figure 4D:
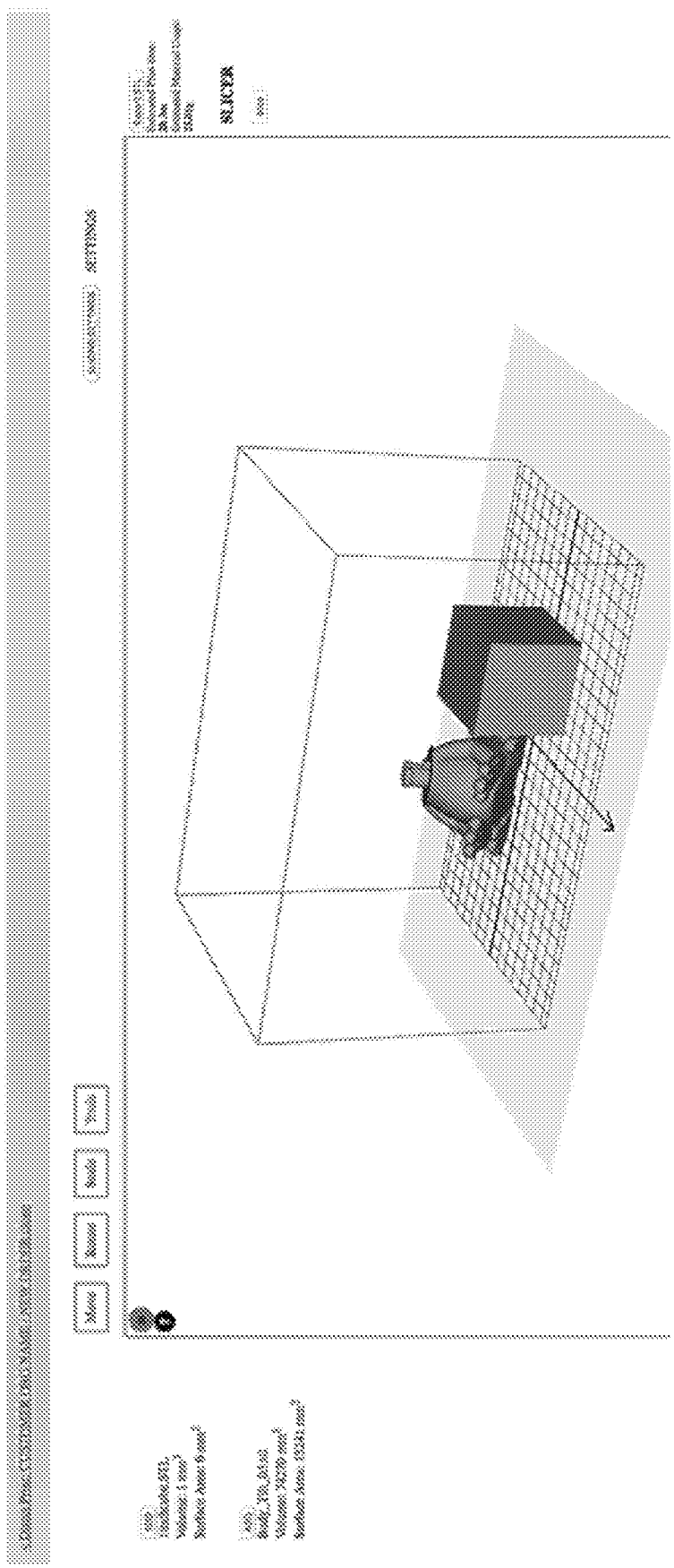
Figure 4E:
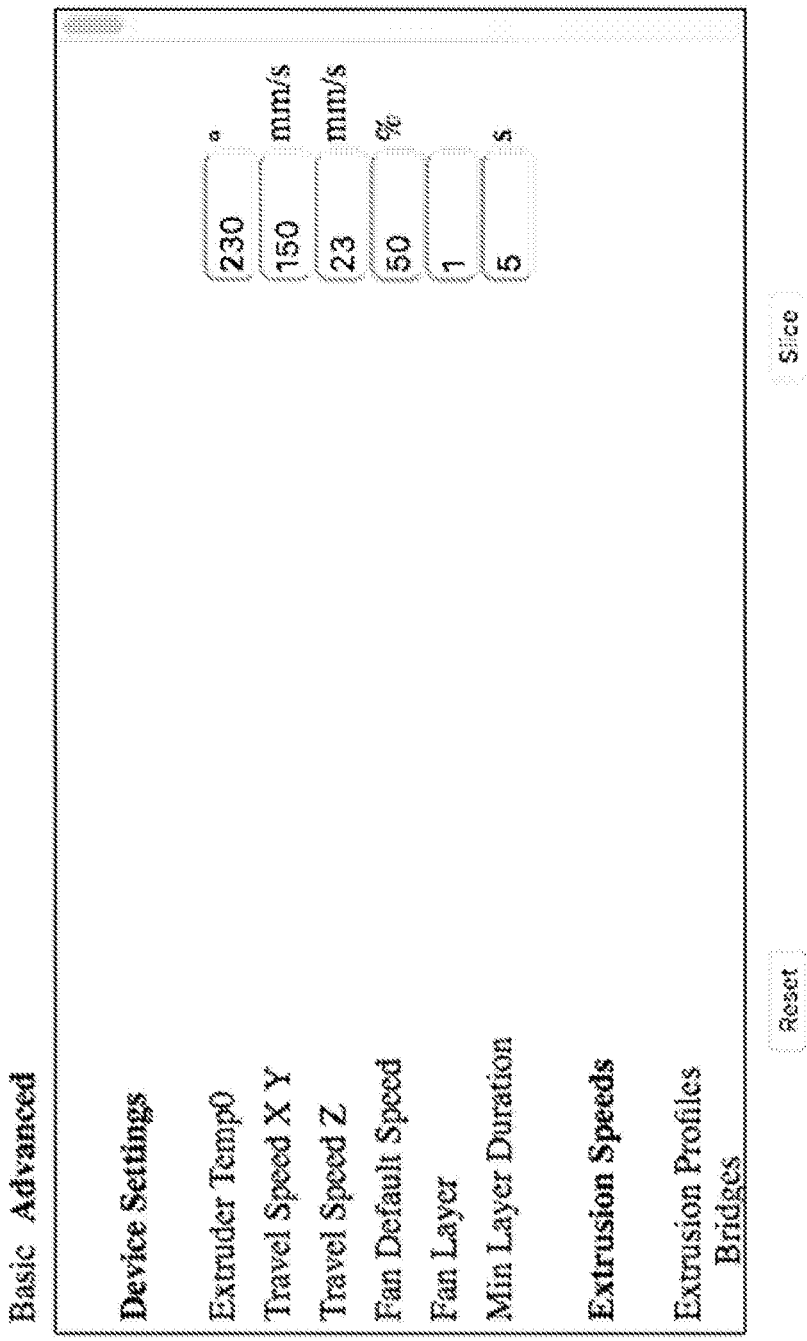

The factory interface 220 includes tools for factory operators to (1) monitor order status, as illustrated in FIG. 4A; (2) view order details, as illustrated in FIG. 4B; (3) configure printing parameters including part orientation and part layout on the build plate, as illustrated in FIG. 4C and FIG. 4D; and (4) configure other manufacturing settings, as illustrated in FIG. 4E.

An example factory interface 220 illustrating order status indicates, for each order, a receipt time, an order deadline, an order type (e.g., direct print or quotation request (aka a "volume order"), a project name (e.g., part name), a customer name, an order status, and order statistics (e.g., number of model files, number of parts, estimated print time). The order status refers to the stage of the object in the manufacturing process. Example order statuses include: in preparation (i.e., awaiting completion of orientation selection and layout completion), printing, post-processing (e.g., harvesting from the printer build plate, removing support material, painting, buffing, electroplating, other non-printing steps); and stalled (e.g., delayed for a higher priority order or pending customer correction of an invalid design file). An order may be associated with multiple model files where the order corresponds to an object made of multiple parts each corresponding to one of the model files. For example, the order corresponds to an object larger than the printing capacity of a printer 130, so the object is fabricated by printing multiple interlocking parts. Determination of estimated print or manufacturing time is described further with respect to FIG. 3. An example factory interface 220 illustrating order status is illustrated in FIG. 4A.

An example factory interface 220 illustrating order details indicates further details about a particular order. The order details include the information described with respect to order status as well as the shipping status (e.g., shipping carrier, delivery date, tracking information). The order details include information about each of the model files included in the order. For each model file, the order details include a quantity to print (i.e., total quantity, or per instance of the order quantity), number completed, fabrication material (e.g., PLA (polylactic acid) plastic), color, and print time remaining. A factory interface 220 presenting order status is illustrated in FIG. 4B.

An example factory interface 220 for configuring printing parameters includes a three-dimensional model of the part layout on the build plate. The build plate may be represented by a plane with a grid, and the available print volume may be represented by a wire frame box (or other applicable shape), as illustrated in FIG. 4C. In one embodiment, the layout planner 515 determines the layout of part instances on the build plate. An example of an automated process for generating a layout of one or more part instances on a build plate is described with respect to FIG. 9. In this embodiment, the generated layout may be presented in the factory interface 220 for review and approval by a factory operator before the layout is printed.

In another embodiment, a factory operator interacts with the factory interface 220 to manually generate the layout of part instances on the build plate. In this embodiment, the factory operator selects orientations for part instances from part files and places the part instances on the build plate. The factory operator may place multiple part instances from the same model file, part instances from multiple model files, or both. The interface includes part statistics about the each model file, such as the volume and surface area of each mode file. The interface may include a slicer tool, which generates slices of the oriented part instance. The slices each correspond to a layer that may be printed. Generally, the slices are oriented parallel to the plane of the build plate, but other configurations are possible. The slices are used to generate manufacturing instructions (e.g., G-code) that the manufacturing tool uses to manufacture the part.

An example factory interface 220 for configuration of printing parameters is illustrated in FIG. 4C and FIG. 4D. FIG. 4C illustrates the factory interface before the part instances are oriented and placed on the build plate, and FIG. 4D illustrates the layout of the build plate after the part instances are oriented and placed. The interface may include other orientation and layout options (e.g., part contact with a part fixture of a CNC tool), depending on the manufacturing tool.

An example factory interface 220 for configuring other manufacturing settings includes settings specific to the manufacturing tool (e.g., printer 130). For a printer 130, the device settings may include an extruder temperature (i.e., temperature of plastic extruded from the print head onto the build plate and part layers); a printer head travel speed in the lateral direction (parallel to the build plate); a printer head travel speed in the vertical direction (perpendicular to the build plate); a fan speed (for cooling the printhead and printed part layers); and a minimum amount of time per layer (e.g., to ensure sufficient cooling of an extruded layer before application of a subsequent layer). Other manufacturing settings are possible depending on the manufacturing tool. An example factory interface 220 for configuration of other manufacturing settings is illustrated in FIG. 4E.

The factory monitor 225 determines the tool status of printers 130 and other manufacturing tools. The status of a printer 130 may include time remaining to complete a part (e.g., based on number of layers or volume completed out of total volume or layers); tool errors; or material remaining (e.g., length of plastic material remaining in spool, color of plastic material loaded).

The printer controller 230 controls printers 130 and other manufacturing tools based on the tool status collected by the factory monitor 225 and instructions from factory operators. The printer controller 230 may select printers 130 and manufacturing tools to complete parts based on the tool status determined by the factory monitor 225. For example, the printer controller 230 selects printers 130 based on availability (e.g., status as idle or printing), time until availability (based on time remaining on a printing part and turnaround time), or both. As another example, the printer controller 230 selects printers based on material (or material color) supplied to a printer 130 as well as material (or material color) specified in a part request. The printer controller 230 sends the selected printers 130 (or other manufacturing tools) manufacturing instructions to initiate fabrication. For example, the manufacturing instructions are G-code generated based at least in part on orientation and layout determined by the request processor 215, the factory interface 220, or a combination thereof.

The design tool 235 receives a design request through the customer interface 220 and presents the design request to a designer (using a factory client 125) who prepares a model file to fulfill the design request. The design tool 235 facilitates design by automatically extracting features from the design request and identifying images and model files having these features. Identified images or design files may be presented to a customer, who can select one or more of the presented images or model files. Images or design files selected by the customer (or identified by the design tool 235) are presented to the designer, thereby reducing designer time to prepare a model file to fulfill the design request. The design tool 235 is described further with respect to FIG. 6.

The model file library 240 contains 3D model files of parts and, optionally, image files of fabricated parts. The 3D model files (and image files) are tagged with features. The design tool 235 queries the model file library using features to identify 3D model files, image files, or both that are relevant to a design request.

Print Request Processing

FIG. 5 is a block diagram of a print request processor 215, according to one embodiment. The print request processor 215 includes a file validator 505, an orientation selector 510, a layout planner 515, a quote generator 520, a machine settings module 525, and an instruction generator 530.

The file validator 505 verifies that the model file can be fabricated. For example, the file validator 505 determines whether the file includes surfaces with inverted normals facing an opposite direction from normals of other surfaces of the part. In general, surface normals face outward, so an inverted normal facing the opposite direction from adjacent surface represents a topologically inconsistent part model. If the model file has inverted surface normals, the file validator 505 generates an error message for presentation through the customer interface or factory interface. As another example, the file validator 505 determines whether the model file includes a "watertight" part having interconnected external surface. A non-watertight part may be underdefined (e.g., indeterminate thickness) or have undefined connections between portions of the part. As a third example, the file validator 505 determines a minimum feature size of the part and determines whether the minimum feature size is greater than feature size thresholds associated with the material included in the part request, the printers 130 (or other manufacturing tools) of the factory, or both. As a fourth example, the file validator 505 determines whether the part file includes an insufficiently thick walls thinner than a thickness threshold of the material. As a fifth example, the file validator 505 determines whether the part file includes an insufficiently small joint area between portions of a part having less than a threshold area of the material. As a sixth example, the file validator 505 estimates a quality measure for the printed part (e.g., print resolution, surface roughness, surface flatness, edge straightness) and compares it to a threshold quality measure to determine whether the printed part will attain sufficient quality. The threshold quality measure may be included in the part request or may be specified by a factory operator (e.g., as part of a "low," "medium," or "high" quality standard). If the model file includes an inverted surface normal, a non-watertight part, a part with an incompatible minimum feature size, an insufficient wall thickness, an insufficient joint area, fails to attain sufficient quality, or a combination thereof, the file validator 505 generates an error message for presentation through the customer interface or factory interface.

The orientation selector 510 determines an orientation for fabricating the part relative to the build plate. Typically, a model file include a three-axis coordinate system, so the orientation selector 510 selects an orientation parallel or anti-parallel to one of the axes. However, the orientation selector 510 may also determine an off-axis orientation. The orientation selector 510 may include an orientation display tool incorporated into the factory interface 220. Using the orientation display tool, a factory operator may select an orientation for a part, review an orientation automatically determined by the orientation selector 510, or modify an automatically determined orientation.

The orientation selector 510 may select an orientation based on tool properties of the printer 130. For example, a printer 130 has a defined build volume, and the orientation selector 510 selects an orientation that ensures that each dimension of the part fits within the dimensions of the print volume. As another example, the orientation selector 510 selects an orientation based at least in part on a projected area of the part on the build plate. The orientation selector 510 may select an orientation that minimizes the projected area to maximize the number of instances of the part that the printer 130 can print simultaneously. The orientation selector 510 may select an orientation that maximizes the projected area to minimize the number of layers orthogonal to the build plate and hence to minimize the print time of the part. The orientation selector 510 may select an orientation that corresponds to an intermediate projected area between the minimum and maximum projected areas to minimize a cost function based at least in part on print time and number of build plates used to fulfill a print request. The number of build plates to fulfill a print request depends on the number of part instances printed on a build plate, as determined by the layout planner 515.

Figure 7:
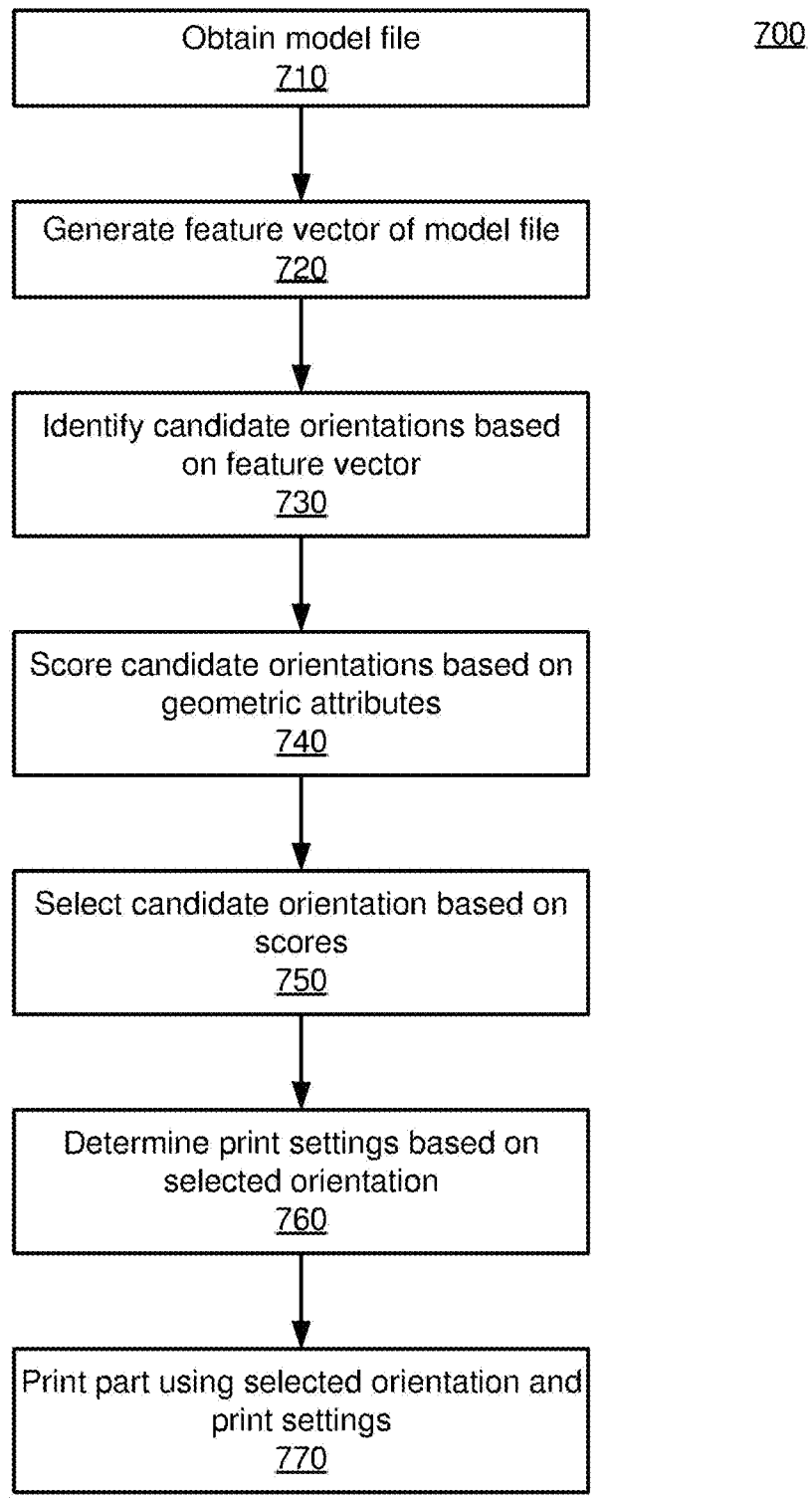
FIG. 7 is a flow chart illustrating an example process for automated configuration of printer settings for part printing, according to one embodiment.

The orientation selector 510 may select an orientation according to a machine learning model that uses features including one or more of projected area, part dimensions, another quantification of the part's geometry, number of part instances per build plate, manufacturing time, and tool properties, as described further with respect to FIG. 7. The orientation selector 510 may select an orientation based at least in part on a suggested orientation determined from the print request or input by a factory operator. The orientation selector 510 may obtain mechanical requirements corresponding to the use of the part and select an orientation to ensure that the printed part complies with the mechanical requirements. This occurs because printed parts may have anisotropic mechanical properties corresponding to the print orientation.

The layout planner 515 generates a layout for printing one or more instances of one or more parts on a build plate given the orientations of the one or more part instances determined by the orientation selector 510. The layout planner 515 may determine a footprint of each part instance based on the projected area of the part onto the build plate. The part footprint may include a buffer zone around the projected area depending on the tool properties of the printer 130. The buffer zone need not be based on projected area. For example, the buffer zone may be modeled three-dimensionally to enable build plate layouts where parts have overlapping projected areas. The layout planner 515 generates a layout of the part footprints that substantially maximizes the number of part instances having part footprints completely within the boundary of the build plate. For example, the layout planner 515 uses a two-dimensional bin packing algorithm. The layout planner 515 need not generate the optimal layout due to computational constraints and diminishing returns of optimization. An example process for generating a layout of part instances on a build plate, which may be performed at least in part by the layout planner 515, is described in further detail with respect to FIG. 9.

The quote generator 520 determines an overall cost for a part request based on expected costs of printing the model file. The quote generator 520 may determine the overall cost based on an anticipated manufacturing time given the orientation determined for the part, part geometry, part features, and tool properties (e.g., estimated cleaning time) of the printer 130 or other manufacturing tools. The manufacturing time may refer to the total machine time to print the part instances in the order, the minimum time to fulfill the order given a number of manufacturing tools available (and allocated) to fulfill the order, or a combination thereof. The quote generator 520 may determine the overall cost based on a number of build plates to fulfill a part request, which depends on the number of part instances in the print layout.

The machine settings module 525 determines other printer settings such as tool head travel speed, manufacturing tool temperature, cooling equipment settings (e.g., for a fan), part infill, layer height, number of outer shells, extrusion speed, other settings (e.g., support settings, raft settings), or any combination thereof.

The instruction generator 530 generates manufacturing instructions (e.g., G-code) for a manufacturing tool based at least in part on the orientation and layout determined for the build plate as well as other machine settings. When used with additive manufacturing, the instruction generator 530 determines layers by slicing the part instances in a direction parallel to the plane of the build plate.

Machine-Assisted Part Design

In some cases, a customer may wish to have a part manufactured but does not have the ability to create a 3D model file for the part. For example, the customer might not have access to a computer-aided design (CAD) application suitable for create a 3D model file, or the customer might not have the time or skill needed to create a 3D model file that properly captures the desired structure, shape, and appearance of the part that the customer wishes to have manufactured.

One possible solution is for the customer to provide a description of their desired part to another user (referred to herein as a designer) so that the designer can create a 3D model file in a computer-aided design (CAD) application based on the descriptive information. However, this process can be time-consuming for both the designer and the customer, especially when the process is performed at scale and a single designer is creating 3D model files for several customers. For instance, the customer and the designer may have to engage in several rounds of communication before the designer has a proper understanding of the customer's desired part, and it may take the designer a substantial amount of time to create a new 3D model file from scratch based the description provided by the customer.

Rather than having a designer create a new 3D model file from scratch, the factory server 120 implements a process that interprets a design request received from a customer and selects one or more 3D model files from a model file library that are similar to the customer's design request. The selected model files are then presented to the designer, and the designer can either copy portions of the model files or use the model files as a reference when creating a new 3D model file to fulfill the customer's design request. In some embodiments, the factory server 120 first identifies a plurality of candidate model files and prompts the customer to select the candidate model files that most accurately represent the customer's desired part. Selecting and providing model files to the designer in this manner allows the designer to fulfill the customer's design request in less time and with greater accuracy.

Figure 6:
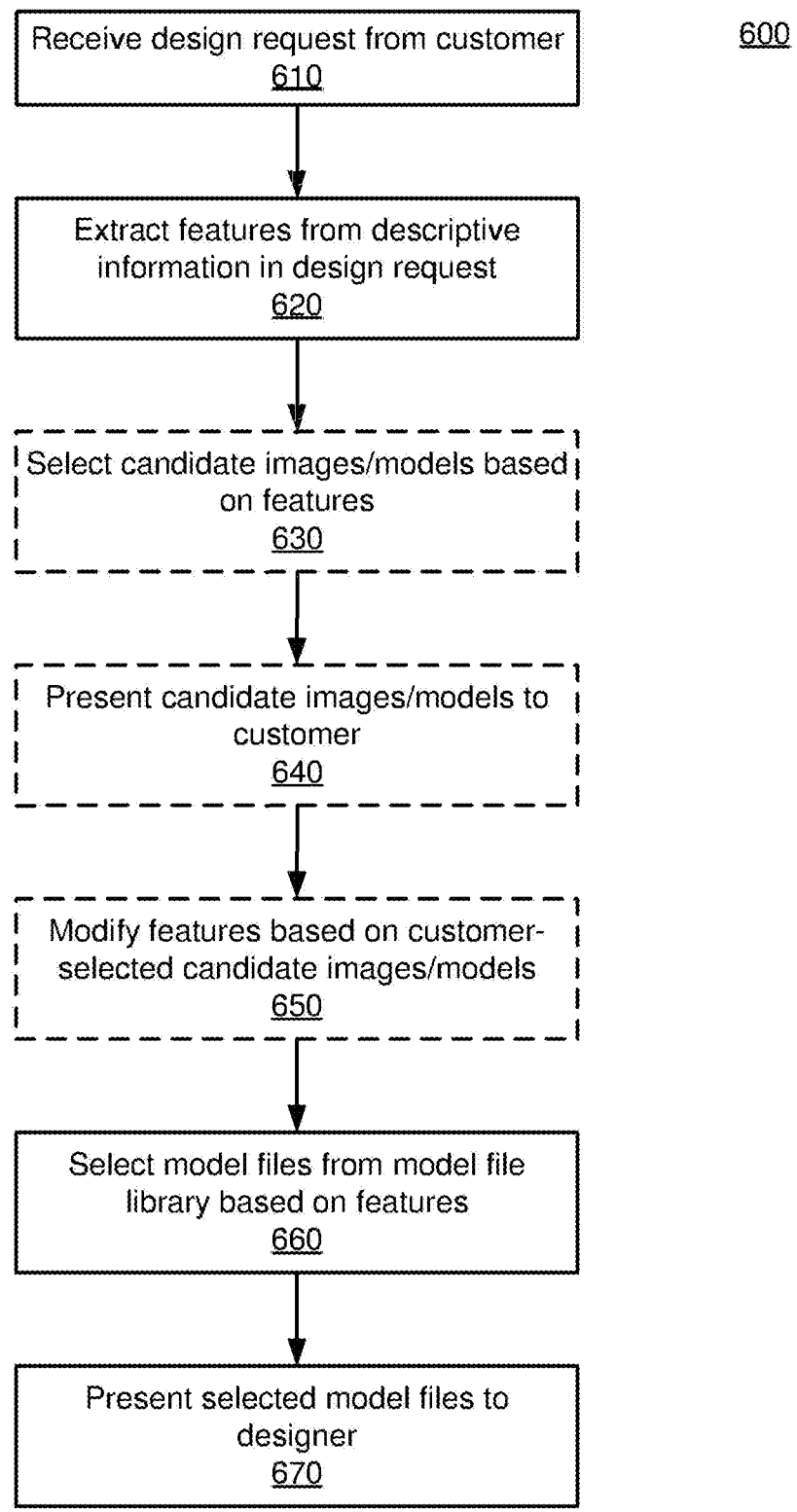
FIG. 6 is a flow chart illustrating an example process for machine-assisted part design using automated interpretation of a design request, according to one embodiment.

FIG. 6 is a flow chart of an example process 600 for machine-assisted part design using automated interpretation of a design request, according to one embodiment. In some implementations, the process 600 includes a different order of steps, additional steps, or fewer steps. The process 600 described with respect to FIG. 6 may be performed by, for example, the design tool 235.

The factory server 120 receives 610 a design request from the customer interface 205 presented by the customer device 110. As referred to herein, a design request is a type of part request that includes descriptive information describing the desired properties of a part requested by the customer (e.g., the desired structure, shape, and/or appearance of the part). For example, the descriptive information may include a written description of the requested part, one or more images of the requested part, other media depicting the requested part, or a combination thereof. The descriptive information may also include information in other formats. For example, the descriptive information may include an audio description of the requested part (which may be a standalone audio file or part of a video), and the factory server 120 may use speech-to-text processing to derive a written description from the audio description. As another example, the descriptive information may include a video or animation (e.g., depicting multiple views of the requested part), and the factory server 120 may extract images from frames of the video or animation.

The design request typically omits a model file for the requested part. However, in some embodiments the descriptive information may include one or more model files in addition to the other types of descriptive information described above. For example, the descriptive information may include a model file for a first portion of a requested part and further includes additional items of descriptive information that describe the desired structure, shape, or appearance of a second portion of the requested. As another example, the descriptive information includes a model file for the requested part and further includes additional items of descriptive information that describe one or more desired changes that the customer wishes to have made to the model file.

The design request may additionally include other information described above as being included in a part request, such as customer contact information, a requested deadline, and an intended production quantity of the part.

The factory server 120 extracts 620 features from the descriptive information. A feature represents a property extracted from the descriptive information. Example features correspond to properties of a part such as a material, a color, a texture, an edge shape, a surface shape, a volumetric shape, or other aspects of a part. For example, the factory server 120 uses natural language processing to identify 620 keywords or phrases (e.g., "beaver," "serrated," "donkey," "threaded hole") in the design request. As used herein, a "keyword" may refer to a single word, a phrase comprising multiple words, an acronym, or a combination thereof. As another example, the factory server 120 uses image processing techniques such as edge detection or image segmentation to identify 620 one or more structures within the image. Each of these structures may be mapped to one or more keywords using a machine learning algorithm (e.g., a decision tree, a neural network, a logistic classifier). The extracted features may be binary (e.g., a binary value indicating whether the property represented by the feature is present or absent) or probabilistic (e.g., a scalar value representing the probability that the descriptive information contains the property represented by the feature).

The factory server 120 may optionally use the extracted features to identify 630 candidate images or models to present 640 to the customer in order to receive feedback. The factory server 120 uses the feedback to refine the extracted features. The extracted features may also be used to select 660 model files to facilitate fulfilment of the design request.

The factory server 120 optionally identifies 630 candidate images or model files based on the features. For example, the factory server 120 queries the model file library 240, which contains model files tagged with various features. The model files may be manually tagged with features by a designer, automatically tagged using a machine learning algorithm, or a combination thereof. Similar to the extracted features, the features tagged for each of the model files may be binary values or scalar values.

The factory server 120 queries the model file library 240 to identify and select model files tagged with features similar to the features extracted from the descriptive information. More specifically, the factory server 120 determines a measure of similarity for one or more model files in the model file library 240 and selects one or more model files based on their respective measures of similarity. In an embodiment where the extracted features are scalar values, the factory server 120 may determine a measure of similarity for one or more model files in the model file library 240 by comparing a feature vector containing tagged features for the one or more model files with a feature vector containing the extracted features. For example, the factory server 120 may compute, for each of the one or more model files, a cosine similarity between the feature vector for the model file and the feature vector containing the extracted features. In this embodiment, the factory server 120 may select model files having a measure of similarity greater than a threshold value or rank the model files according to their respective measures of similarity and select model files having a ranking higher than a threshold ranking.

In another embodiment, the factory server 120 determines the measure of similarity for a model file in the library 240 by determining a number of features in common between the extracted features and the features tagged for the model file. In this embodiment, the factory server 130 may select a model file in response to the model file being tagged with at least a threshold number of the features extracted from the descriptive information.

Instead of (or in addition to) using the features to identify 630 candidate model files, the factory server 120 may identify 630 candidate images from an image library, which may contain images of completed parts or images derived from views of model files. The model file library 240 and image library may include model files and images from external sources (e.g., a third-party database, a search engine).

The factory server 120 optionally presents 640 the identified images or model files through the customer interface 205 of the customer device 110. The customer may select one or more of the identified images or model files to indicate that they are at least similar to the customer's intended design. The customer interface 205 may present 640 multiple sets of images or model files, where each set corresponds to a different property (e.g., color shade, overall shape, texture). The sets may be identified by clustering the identified images or model files based on a vector of the features and selecting a set of images or model files from each cluster. The customer device 110 sends the customer's selections (and non-selections) to the factory server 120.

The factory server 120 optionally modifies 650 the extracted features using the customer's feedback on the presented images. The features may be modified based on a weighted combination between the initial features and features of the presented images and model files. Images and model files that the customer selects receive a positive weight, and those that the customer does not select are given a negative weight. The modified features may be used to further identify 630 images and model files to present 640 to the customer for feedback in order to further refine the features associated with the design request.

The factory server 120 uses the features of the design request to select 660 one or more model files or images to present to a designer. The factory server 120 may use features extracted 620 from the design request or the features modified 650 in response to customer feedback. The selection process is similar to identifying candidate images or model files, as described above with respect to step 630. For example, the factory server 120 determines a measure of similarity for one or more model files in the model file library 240 and selects 660 one or more model files based on their respective measures of similarity in the manner described above with respect to step 630. In various embodiments, the factory server 120 may determine the measure of similarity for the images or model files based on, for example, a number of features in common, a cosine similarity, or a combination thereof. However, the factory server 120 may use different threshold values when selecting 660 the model files to present to the designer versus identifying 630 candidate model files (or images) to present to the customer. For example, the threshold values for these two steps may be configured so that the factory server 120 identifies 630 a larger number of candidate model files to present to the user and selects 660 a smaller number of model files to present to the designer.

The factory server 120 presents 670 the selected model files or images to the designer. In one embodiment, the selected model files or images are presented 670 to the designer using the factory client 125. In another embodiment, the selected model files or images are presented to the designer at a separate computing device that is remote to the factory server 120 and the factory client 125. For example, the separate computing device communicates with the factory server 120 over the network 140. This allows the designer to be located in a different geographic location than the factory server 120 and the printer 120.

The designer fulfills the design request using the model files or images in conjunction with the descriptive information received from the customer as part of the design request. For example, the designer may refer to the selected model files or images to design a model file that is consistent with the descriptive information. The designer may also copy portions of a selected model file to reduce time for creating the new model file. In one embodiment, the factory client 125 (or the separate computing device) also presents a user interface that allows the designer to design the model file that fulfills the design request. For example, a CAD application is installed on the factory client 125 and the factory client 125 presents a user interface of the CAD application. After the designer fulfills the design request, the resulting model file may be sent to the factory server 120, and the factory server 120 may generate manufacturing instructions (e.g., G-code) for the model file and control one of the printers 130 to fabricate the model file. The factory server 120 may also send the model file to the customer device so that the customer can keep the model file for their records.

Automated Configuration of Printer Settings

Before a 3D printer can be used to fabricate a part based on a model file, an operator of the 3D printer typically has to perform several manual steps to prepare the part for printing. For instance, the operator may manually inspect the part file to determine whether the part can be printed in the orientation indicated by the coordinate axes in the model file, or if a different orientation should be used. Similarly, the operator may select printer settings, such as print speed and quality, layer thickness, and material type. When performed manually by a human operator, these preparation steps can be time consuming and can substantially slow down the rate at which the automated manufacturing environment 100 can fabricate parts. In addition, a human operator may make mistakes or select less-than-optimal orientations or printer settings.

Rather than having a human operator perform these preparation steps, the factory server 120 performs a process that selects the orientation in which a part will be printed. In particular, the factory server 120 identifies one or more candidate orientations for the part. If the factory server 120 identifies a single candidate orientation, the factory server 120 selects this orientation. If the factory server 120 identifies multiple candidate orientations, the factory server 120 also scores each candidate orientation based on geometric attributes of the orientation and uses the scores to select a candidate orientation. The process can also automatically determine other printer settings, such as print speed and quality, layer thickness, and material type, based on the model file, the selected orientation, and additional information about the part that is provided by the customer (e.g., the intended environment or use of the part). This process allows the factory server 120 to fulfill part requests more rapidly and with less interaction from a factory operator.

FIG. 7 is a flow chart of an example process 700 for automated configuration of printer settings for part printing, according to one embodiment. In some implementations, the process 700 includes a different order of steps, additional steps, or fewer steps.

The factory server 120 obtains 710 a model file for a part. For example, the customer interacts with the customer interface 205 to upload a model file. In addition to obtaining 710 the model file, the factor server 120 may also obtain additional information about the part from the customer. For example, the customer may provide (e.g., via the customer interface 205) information about the part's intended environment (e.g., whether the part will frequently be subjected to vibrations or mechanical loads, the expected position and direction of the mechanical loads, and whether the part will be exposed to particular temperature ranges or thermal cycling). The customer may also provide information about the part's intended use, or simply indicate a desire for the part to be fabricated in a manner that yields certain material properties, such as increased stiffness, increased flexibility, or increased/decreased thermal expansion.

After obtaining 710 the model file, the factory server 120 generates 720 a feature vector based on the model file. Each value in the feature vector represents a geometric feature of the part. For example, the feature vector may include values representing orientations and sizes of external flat surfaces on the part. As another example, the feature vector may include the length, width, and height of the part along the coordinate axes in the model file. As a third example, the feature vector may include values representing the projected areas of the part along the three coordinate plates in the model file. As a fourth example, the feature vector may include values representing the flatness or curvature of surfaces perpendicular to each of the coordinate axis. As a fifth example, the feature vector may include values representing the orientation of intricate features, such as raised or depressed lettering or logos. The factory server 120 may identify such intricate features from regions having locally high curvature or having a relatively high amount of information represented in high-frequency components of a spatial Fourier transform or other similar transform of the model.

The factory server 120 identifies 730 one or more candidate orientations for the part based on the feature vector for the part. Each candidate orientation represents a possible way of orienting the part on a build plate of a 3D printer. In one embodiment, a candidate orientation is defined as a normal vector that represents the direction perpendicular to the surface of the build plate. For example, a candidate orientation may correspond to one of the coordinate axes included in the model file, in which case the coordinate axis (e.g., the z-axis) is the normal vector. However, the factory server 120 may also identify other candidate orientations for the part. In one embodiment, the factory server 120 provides the feature vector that was generated 720 from the model file to a first machine learning model, and the machine learning model outputs one or more candidate orientations. The first machine learning model may be trained with feedback received from a factory operator, as described further with reference to step 750. In various embodiments, the first machine learning model may be a statistical decision tree, a neural network, or a combination thereof.

In another embodiment, the factory server 120 performs a heuristic analysis of the feature vector to identify 730 one or more candidate orientations for the part. For example, the factory server 120 may identify the coordinate plane with the largest projected area and identify a candidate orientation defined by a normal vector that is perpendicular to this coordinate plane. As another example, the factory server 120 may identify a candidate orientation in which an intricate feature on the part is parallel to the build plate (i.e., the normal vector of the candidate orientation is substantially perpendicular to the intricate feature). This allows the part to be printed with the intricate feature facing away from the build plate (i.e., with the side of the part opposite to the intricate feature resting on the build plate), which may reduce failure rates when fabricating the intricate feature on the part.

In still another embodiment, the factory server 120 identifies 730 one or more candidate orientations for the part by performing a heuristic analysis on the model file without generating 720 a feature vector. For example, the factory server 120 identifies exterior flat surfaces that are relatively large compared to other flat surfaces around the exterior of the part or compared to the total external surface area of the part. In this example, the factory server 120 generates one or more candidate orientations defined by a normal vector perpendicular to the identified large flat surfaces. In other words, in each of these candidate orientations, an identified flat surface is parallel to the plate of the build plate, which allows the part to be printed with the flat surface resting on the build plate.

To identify the relatively large flat surfaces, the factory server 120 may, for example, compute a total external surface area of the part, compute the surface area of a plurality of flat surfaces around the exterior of the part, and identify exterior flat surfaces having a surface area greater than a threshold percentage of the total external surface area. For instance, the factory server 120 may identify exterior flat surfaces having a surface area greater than 10% of the total external surface area of the part.

The factory server 120 generates a set of geometric attributes for each of the candidate orientations and scores 740 each candidate orientation based on its geometric attributes. Each of the geometric attributes quantifies one aspect of the part's geometry when the part is in a particular candidate orientation. The geometric attributes may include the dimensional properties of the part derived based on the identified candidate orientations. For example, the geometric attributes for a candidate orientation may include the length and width of the part along the plane of the build plate. As another example, the geometric attributes for a candidate orientation may include the height of the model when the part is resting on the build plate (i.e., the height of the model in the direction of the normal vector). As still another example, the geometric attributes for a candidate orientation may include the projected areas of the part onto the plane of the build plate or onto a plane perpendicular to the build plate. As a further example, the geometric attributes may include the flatness or curvature of surfaces perpendicular or parallel to the build plate. As a fourth example, generating the geometric attributes for a candidate orientation may include calculating a volume or surface area of support material to be added when fabricating the part in the candidate orientation.

The factory server 120 may also generate geometric attributes for a candidate orientation that represent the orientation of one or more intricate features on the part when the part is placed in the candidate orientation. As noted above, the factory server 120 may identify such intricate features based on a spatial Fourier transform or other similar transform of the model. A geometric attribute representing the orientation of one or more intricate features may have a more favorable value (i.e., a value that increases the likelihood of the candidate orientation being selected) when the intricate features are closer to being oriented parallel to the build plate. This is advantageous, for example, because it may be easier for a 3D printer to fabricate an intricate feature when the feature is oriented substantially parallel to the build plate.

The factory server 120 may also generate a geometric attribute corresponding to an estimated printing time for a part in a given candidate orientation. The factory server 120 may also generate a geometric attribute for a candidate orientation corresponding to an estimate of how many copies of a part may be printed on a single build tray when the part is printed in the candidate orientation.

The factory server 120 scores 740 the candidate orientations based on the geometric attributes for each candidate orientation. The scoring of the candidate orientations may be performed based on a weighted combination of the geometric attributes. The scoring may be based on weights determined by a second machine learning model (e.g., statistical, decision tree, neural network, or a combination thereof). For example, the score for a candidate orientation may represent the "cost" or difficulty of printing the part using the candidate orientation. Alternatively, the score for a candidate orientation may increase with decreasing difficulty of printing the part using the candidate orientation so that candidate orientations that allow for "easier" printing have higher scores. As other examples, the score for a candidate orientation may represent the quality, strength, and/or potential failure rate of the part if the part is printed in the candidate orientation.

The factory server 120 selects 750 one of the candidate orientations based on the scores. In one embodiment, the factory server 120 selects a single "best" candidate orientation having the lowest "cost" score. In this embodiment, the factory server 120 may optionally present the selected candidate orientation to an operator using the factory client 125, which prompts the operator to approve or reject the presented candidate orientation. If the operator rejects the presented candidate orientation, the operator may input a corrected orientation (e.g., by selecting one of the non-selected candidate orientations). If the operator approves the presented candidate orientation, the presented candidate orientation is retained as the selected candidate orientation.

In another embodiment, the factory server 120 first selects a plurality of candidate orientations according to the scores. For example, the factory server 120 ranks the candidate orientations according to the scores and selects one or more candidate orientations based on the ranking (e.g., the three lowest-difficulty orientations). Similar to the previous embodiment, the factory server 120 may optionally present the part according to each of the selected candidate orientations and prompt the operator to choose between of one of the presented candidate orientations. Alternatively, the operator may reject all of the presented candidate orientations, in which case the operator may input a different orientation (e.g., one of the non-selected candidate orientations).

When the operator provides input (e.g., approval, rejection, or selection of a candidate orientation), the factory server 120 may use the operator input for training the first machine learning model (which may be used to identify one or more candidate orientations), the second machine learning model (which may be used to score the candidate orientations), or some other algorithm that is used to determine weights for scoring the candidate orientations. Training data may also be collected from previous prints based on the orientations before and after operator input.

In an alternative embodiment, the factory server 120 identifies 730 a single candidate orientation based on the feature vector for the part. In this embodiment, the identified candidate orientation may automatically be selected 750. Alternatively, the factory server 120 presents the identified candidate orientation to the factory operator and prompt the operator to approve or reject the candidate orientation in the same manner as described above.

The factory server 120 determines 760 print settings based on the selected orientation and additional information about the part that is provided by the customer (e.g., the intended use of the part). As noted above, information about the intended environment of the part may include, for example, information indicating whether the part will be subjected to mechanical loads, particular temperature ranges, thermal cycling, or vibration. Determined print settings may include print speed and quality, layer thickness, number of outlines, material type, printing temperature, rafts, type of support material, and infill. For example, if the additional information indicates that the part's intended environment will subject the part to mechanical loads, the factory server 120 may select printer settings that yield a higher part strength (e.g., thicker layers, higher number of outlines, etc.). As another example, if the additional information indicates that the part's intended use necessitates higher part quality (e.g., the part is meant to be presented as a gift or displayed prominently as a decorative piece), then the factory server 120 may select printer settings that yield a higher part quality (e.g., lower print speed, thinner layers, etc.).

In addition to determining 760 print settings based on the selected orientation, the factory server 120 may also generate a layout of one or more instances of the parts on the build plate, where the parts are oriented in the selected orientation. An example process for determining a layout of part instances on a build plate is described below with respect to FIG. 9.

The factory server 120 instructs a printer 130 to print 770 the part in the selected orientation and using the determined print settings. For example, the factory server 120 generates manufacturing instructions (e.g., G-code) and sends the manufacturing instructions to the printer 130 along with the determined print settings.

Although the process 700 is described with reference to the factory server 120 of the automated manufacturing environment 100, this process 700 for automatically orienting a part on a build plate and automatically determining print setting may also be applied to other types of manufacturing environments in which a 3D printer is used. For example, the process 700 may be adapted for use with a 3D printer suitable for use (printing one part at a time or printing a relatively small number of parts at a time) by a user in a non-factory setting, such as a home, laboratory, or workplace. Continuing with this example, one or more candidate orientations may be presented to the user (i.e., the same user who provides the model file) rather than to a factory operator in order to receive approval, rejection, or selection of a candidate orientation.

Fabrication of Three-Dimensional Part with Two-Dimensional Image Applied Thereon In addition to manufacturing a three-dimensional part, in some instances a customer may wish to apply a two-dimensional graphic or image to one or more faces of the part. For example, the customer may wish to print a company logo, an ornamental graphic, a graphic imitating a texture (e.g., wood or marble), or a color (e.g., colored headlights for a toy car) on the part. One possible process for fabricating a part with an image printed on one of its surfaces is to 3D print the part on a build plate, physically remove the part from the build plate, reorient the part so that the one or more faces with the printed image are accessible to an image printer (e.g., a pad printer) and oriented correctly relative to the axes of the image printer, and then apply the 2D image to the face. This process can be time consuming, especially when performed at a large scale, because the steps of removing the part from the build plate and reorienting the part are typically performed by a human operator.

Rather than having a human operator remove the 3D part from the build plate and reorient the part prior to applying the 2D image, the factory server 120 implements a process that prepares the 3D part for printing so that the 3D part is printed in an orientation that allows the 2D image can be applied to the appropriate faces of the 3D part without having to remove the part from the build plate. The factory server also generates printing instructions for the 2D image, such as scaling and rotating the image to account for the size of the part and the orientation of the part on the build plate. This results in a more efficient and streamlined process for fabricating a 3D part with a 2D image printed on one or more of its faces.

Figure 8:
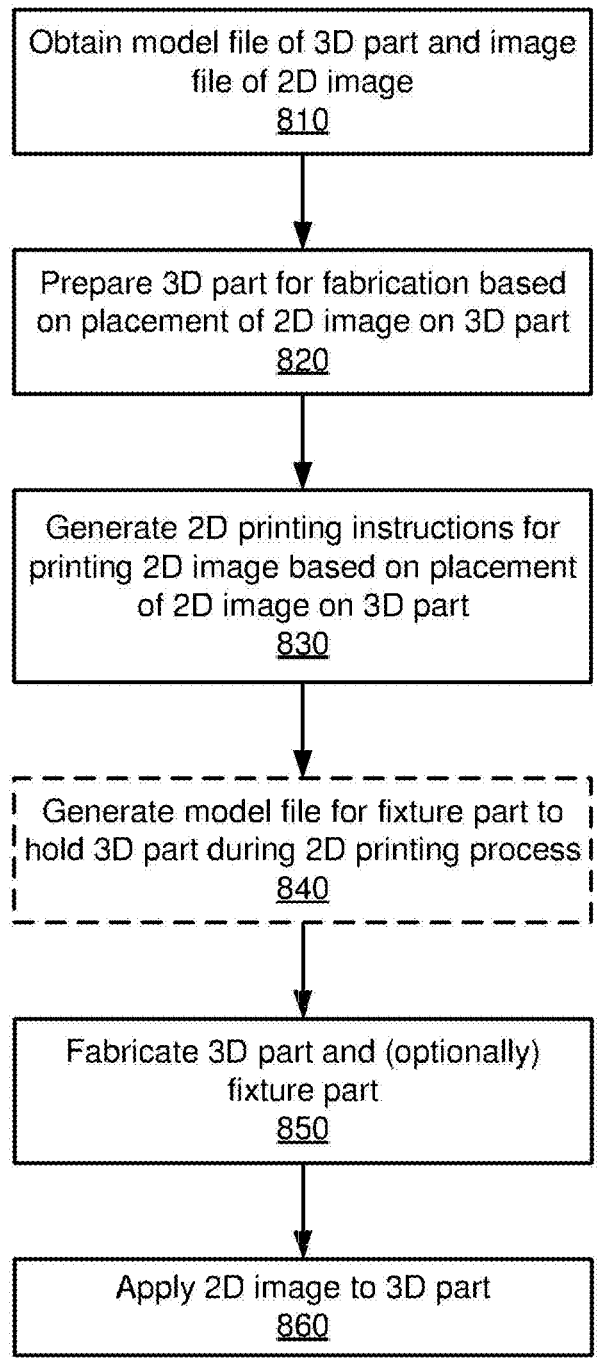
FIG. 8 is a flow chart illustrating an example process for fabricating a three-dimensional part with a two-dimensional image applied to a surface of the part, according to one embodiment.

FIG. 8 is a flow chart of an example process 800 for fabricating a three-dimensional part with a two-dimensional image applied to a surface of the part, according to one embodiment. In some implementations, the process 800 includes a different order of steps, additional steps, or fewer steps.

The factory server 120 obtains 810 a model file of a 3D part and an image file. Typically the image file is a two-dimensional image, but some images may have additional dimensional components (e.g., images from a stereoscopic camera, holographic images, texture maps corresponding to a three-dimensional mesh). In one embodiment, the 3D part and the 2D image are obtained 810 through the customer interface 205. For example, the customer interacts with the customer interface 205 to upload the model file and the image file.

The factory server 120 also obtains 810 a placement of the 2D image on the 3D part. As referred to herein, a placement of a 2D image on a 3D part specifies one or more faces of the 3D part and a portion of each of the faces on which 2D image is to be printed. The faces on which the 2D image is to be printed are hereinafter referred to as the image faces. In one embodiment, the customer interface 205 allows the customer to place the image on the part. Additionally or alternatively, a factory operator uses the factory interface 220 to place the image on the part based on instructions from the customer. The customer interface 205 (or factory interface 220) may present an estimated appearance of the image on the part based on a color of the underlying part and the colors of the image. The interface 205 or 220 may include tools to modify the colors of the image so that the printed image on the fabricated part has the appearance desired by the customer. For example, the tools include slider bars to change the relative intensity of color pigments or to modify the overall lightness or darkness of the image.

The factory server 120 prepares 820 the part for fabrication based on the placement of the image on the part. In one embodiment, preparing 820 the part for fabrication includes selecting an orientation for the part relative to the build plate that facilitates easier printing of the image on the image faces after the part is fabricated. In particular, the factory server 120 may select an orientation for fabricating the part such that the one or more image faces are oriented facing away from a build plate (e.g., upwards). Orienting the part in this manner is advantageous, for example, because it allows the image be printed on the image faces of the part without removing the part from the build plate. This also allows the build plate to be used as a natural fixture to hold the part in a known location when applying the 2D image.

In some implementations, the image may be printed on the part in a side orientation, so the factory server 120 selects an orientation that provides at least a threshold amount of clearance between an edge of the image and the build plate. For example, if the part is a triangular prism with images placed on one half of each of its rectangular faces, then the factory server 120 orients the rectangular faces perpendicular to the build plate such that the halves of the rectangular faces with the images are farther from the build plate surface than the halves of the rectangular faces without the images. Orienting the part to provide a threshold of clearance can also allow the image to be printed on the image faces without removing the part from the build plate.

The factory server 120 determines other print settings based on the selected orientation. In some cases (e.g., where images are to be printed on all sides of a part), the placement of the images does not affect the selected orientation. The factory server 120 generates printing instructions for the printer 130 based on the determined print settings.

In some embodiments, preparing 820 the part for fabrication based on the placement of the image includes modifying the model file. For example, the factory server 120 modifies the model file to add a protruding surface corresponding to the placed image. As another example, the factory server 120 modifies the model file to add a complimentary surface texture, such as a rough texture or a wavy texture. The protruding surface may be embossed according the content of the image. For example, the factory server 120 identifies figures in the image (e.g., alphanumeric characters, faces, or other shapes) and generates positive or negative relief matching the identified figures. The identified figures may be identified using optical character recognition, facial recognition, other object detection algorithms, edge detection, other image processing techniques, user input, or a combination thereof.

The factory server 120 generates 830 2D printing instructions based on the placement of the image on the part. Generating the 2D printing instructions may include scaling and rotating the image based on the resolution of the printer and the area of the part selected for the image. Generating the 2D printing instructions may further include generating colors for the printed image based on properties of the printer, properties of the part material (e.g., color, roughness), or both. Such color generation may automatically correct for color distortions resulting from printing on a colored surface of the part. The color correction may further be based on expected lighting conditions of the part (e.g., outdoor use, indoor use in a dimly lit room, indoor use in a brightly lit room). The particular format of the 2D printing instructions depends on the type of image printer. For example, the image printer may be a UV printer, an inkjet printer, or a pad printer. If the image printer is a pad printer, generating the print instructions may include selecting a pad type. For example, the print instructions may specify a pad with a particular shape, size, stiffness, or material. As further examples, the print instructions may specify a particular ink type or pad printer type.

The factory server 120 may optionally generate 840 one or more model files to facilitate printing the image on the fabricated part. For example, the one or more model files include a fixture to hold the fabricated part in place during the image printing process. As another example, the one or more model files include a stereotype or cliche for a pad printer to print the image. The model files (e.g., fixture, pad stereotype) may be placed on a same build plate as one or more copies of the part. In this way, the steps of preparing the pad printer are partially incorporated into fabricating the part itself, thus reducing manufacturing time and costs.

The factory server 120 fabricates 850 the part based on the model file. Fabricating may include 3D printing, other additive manufacturing methods, or other methods described herein used separately or in combination. Optionally, fabricating the part includes fabricating a fixture to facilitating image printing, fabricating a stereotype for pad printing the image, or both. The factory server 120 prints 860 the image on the part based on the 2D printing instructions. Printing the image 860 may include using a fixture or stereotype fabricated with the part. Printing the image 860 may occur without using a fixture. For example, the image is printed while the part is attached to the build plate.

Automated Layout of Part Instances on Build Plate

In some implementations, the factory server 120 controls 3D printers 130 that are large enough to print multiple part instances on a single build plate. For example, the build plate may be large enough for the 3D printer to print thirty part instances at once (e.g., 30 copies of the same part, single copies of 30 different parts, etc.). However, before the 3D printer can print the part instances, the part instances have to be laid out at different, non-overlapping positions on the build plate. One method of laying out the part instances is simply to have a factory operator manually manipulate the part instances to create the layout, which can be time-consuming, inefficient, and suboptimal. Alternatively, the factory server 120 may perform a 3D packing process to place different part instances on the build plate, but a 3D packing process can be relatively computationally intensive.

Instead, the factory server 120 performs an automated layout process in which the factory server 120 generates a two-dimensional (2D) footprint for each part instance and performs a two-dimensional packing algorithm to arrange the footprints on the build plate. The packing algorithm establishes the position of each part instance within the layout. After generating the layout, the factory server 120 controls a 3D printer 130 to fabricate the layout. This automated layout process is faster than a human operator, and using a two-dimensional packing algorithm makes the process more computationally efficient than a three-dimensional packing process.

Figure 9:
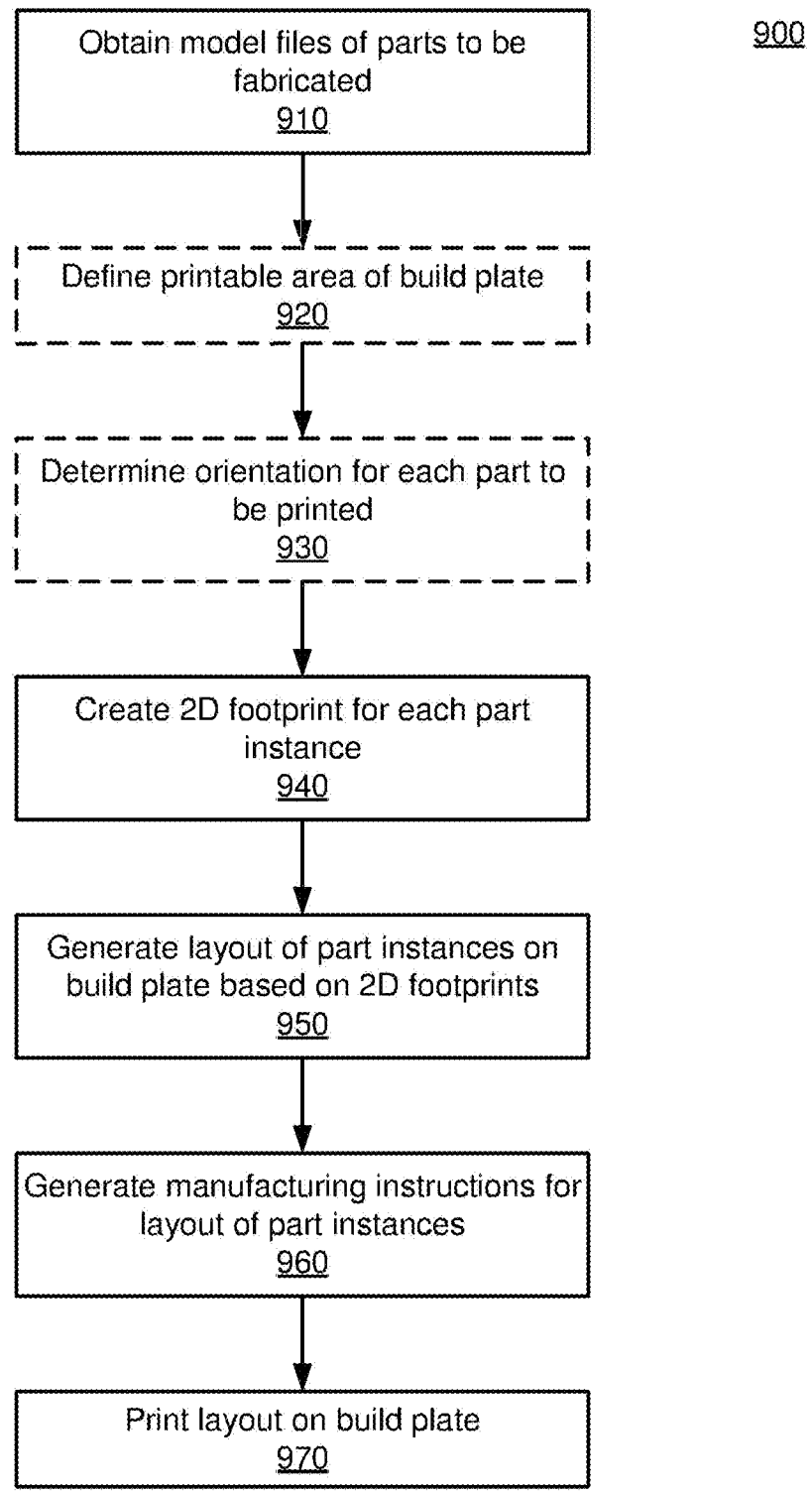
FIG. 9 is a flow chart illustrating an example process for generating a layout of one or more part instances on a build plate, according to one embodiment.

FIG. 9 is a flow chart of an example process 900 for automated layout of one or more part instances on a build plate, according to one embodiment. In some implementations, the process 900 includes a different order of steps, additional steps, or fewer steps.

The factory server 120 obtains 910 one or more model files of parts to be fabricated. In addition to obtaining the model files, the factory server 120 also obtains a number of instances of each part to fabricate. For example, the factory server 120 may obtain 910 instructions to fabricate three instances of a first part, four instances of a second part, and one instance of a third part. For ease of description, each instance of a part is referred to as a part instance. For instance, there are a total of eight part instances in the previous example. In one embodiment, a customer uses the customer interface 205 to upload a model file of a part and specify the number of instances of the part that should be fabricated.

The factory server 120 may optionally define 920 a printable area covering a portion of the build plate. In one embodiment, the printable area covers a first portion of the build plate that includes the center of the build plate and extends outward toward the edges, but stops short of the edges. Instead, the factory server 120 creates a non-printable area along the edges of the build plate. In other words, the printable area covers the first portion of the build plate, and the non-printable area covers a second portion of the build plate that has outer edges corresponding to the edges of the build plate and inner edges corresponding to the edges of the first portion.

It is advantageous to define 920 the printable area in this manner because, for example, failure rates may be higher for part instances that are fabricated closer to an edge of the build plate (e.g., due to warping or dislodging of the part during fabrication because the build plate is not perfectly level). Thus, by defining 920 a printable area that stops short of the edges and defining a non-printable area along the edges, the factory server 120 generates a layout that does not place any part instances within a threshold distance of an edge of the part, which reduces the overall failure rate of the part instances in the layout.

In various embodiments, the non-printable region can have a predetermined width or a width based on the dimensions of the build plate. For example, the factory server 120 may define a non-printable region with a fixed width (e.g., 2 inches) on all four sides of the build plate. As another example, the factory server 120 may define a non-printable region whose width along each edge of the build plate is a fixed percentage (e.g., 10%) of the build plate dimension in the direction perpendicular to the edge. For instance, if the build plate has dimensions of 20 inches by 30 inches, the non-printable region has a width of 3 inches (10% of 30 inches) along the two 20-inch sides and a width of 2 inches (10% of 20 inches) along the two 30-inch sides. As a result, the printable area has dimensions of 16 inches by 24 inches. In an embodiment where this step 920 is omitted, the factory server 120 uses the entire surface area of the build plate as the printable area.

The factory server 120 may optionally determine 930 an orientation for each part to be printed. In one embodiment, the factory server 120 determines 930 an orientation for a part by steps 720 through 750 of the process 700 described with respect to FIG. 7 for the model file corresponding to the part. In another embodiment, the factory server 120 performs a different process to determine 930 an orientation of the part. For example, the factory server 120 automatically selects the orientation perpendicular to the largest exterior flat surface of the part. In an embodiment where this step 930 is omitted, the factory server 120 may use one of the coordinate axes in the model file (e.g., the z-axis) for a part as the orientation for the part. In an embodiment where this step 930 is included, the factory server 120 performs the subsequent steps 940 through 970 of the process 900 based on the determined 930 orientation for each part.

The factory server 120 creates 940 a 2D footprint for each part instance. As referred to herein, the 2D footprint for a part instance is a two-dimensional region that encompasses the portion of the build plate that the part instance will occupy while the part instance is being fabricated. In one embodiment, the factory server 120 creates 940 a 2D footprint for a part instance by computing a projection of the part instance onto the plane of the build plate. However, the 2D footprint for a part may also have a different shape and be created 940 in a different manner. For instance, in another embodiment, the 2D footprint for a part instance is a bounding rectangle that encompasses the projection of the part instance onto the place of the build plate. The bounding rectangle may be created, for example, by finding the x, y, and z dimensions of the smallest rectangular prism that fits the part instance, and then using the x and y dimensions as the dimensions of the bounding rectangle. Using a bounding rectangle as the 2D footprint (rather than a projection of the part instance) can be advantageous, for example, because the subsequent step of generating 950 a layout based on the 2D footprints is both simpler and less computationally demanding if the 2D footprints are rectangular.

The factory server 120 may optionally expand the 2D footprint for a part instance by adding a buffer zone around the 2D footprint. In an embodiment where 2D footprint is created 940 as a bounding rectangle, the factory server 120 may add the buffer zone by expanding the bounding rectangle by a fixed amount (e.g., 1 inch) in all four directions. Alternatively, the factory server 120 may add the buffer zone by identifying a centroid of the 2D footprint that was created 940 and scaling the 2D footprint by a fixed percentage (e.g., 10%) about the centroid.

Because different instances of the same part are identical, this step 240 may be performed a single time for a part to create a 2D footprint for the part (and optionally add a buffer zone around the 2D footprint), and the factory server 120 may then associate the resulting 2D footprint with each instance of the part.

The factory server 120 generates 950 a layout of part instances on the build plate based on the 2D footprints for the part instances. In one embodiment, the factory server 120 performs a two-dimensional bin packing algorithm or sprite packing algorithm to generate 950 the layout. If the factory server 120 defined 920 a printable area of the build plate, the factory server 120 generates 950 a layout within the boundaries of the printable area. If the factory server 120 did not define 920 a printable area, the factory server 120 generates 950 a layout within the edges of the build plate.

The factory server 120 generates 960 manufacturing instructions (e.g., G-code) for the generated 950 layout of part instances on the build plate. In one embodiment, the factory server 120 generates a combined model file representing the layout of the part instances after generating 950 the layout. In this embodiment, the factory server 120 generates 960 manufacturing instructions for the combined model file. In another embodiment, the factory server 120 generates separate manufacturing instructions for each of the model files, and after generating 950 the layout, the factory server 120 joins the manufacturing instructions to generate 960 the manufacturing instructions for the layout.

After generating 960 the manufacturing instructions, the factory server 120 controls a 3D printer 130 to print 970 the layout on a build plate in order to fabricate the part instances in the layout. For example, the factory server 120 sends the manufacturing instructions for the layout to a 3D printer 130, and the 3D printer 130 executes the manufacturing instructions to print 970 the layout.

Hardware Components

Figure 10:
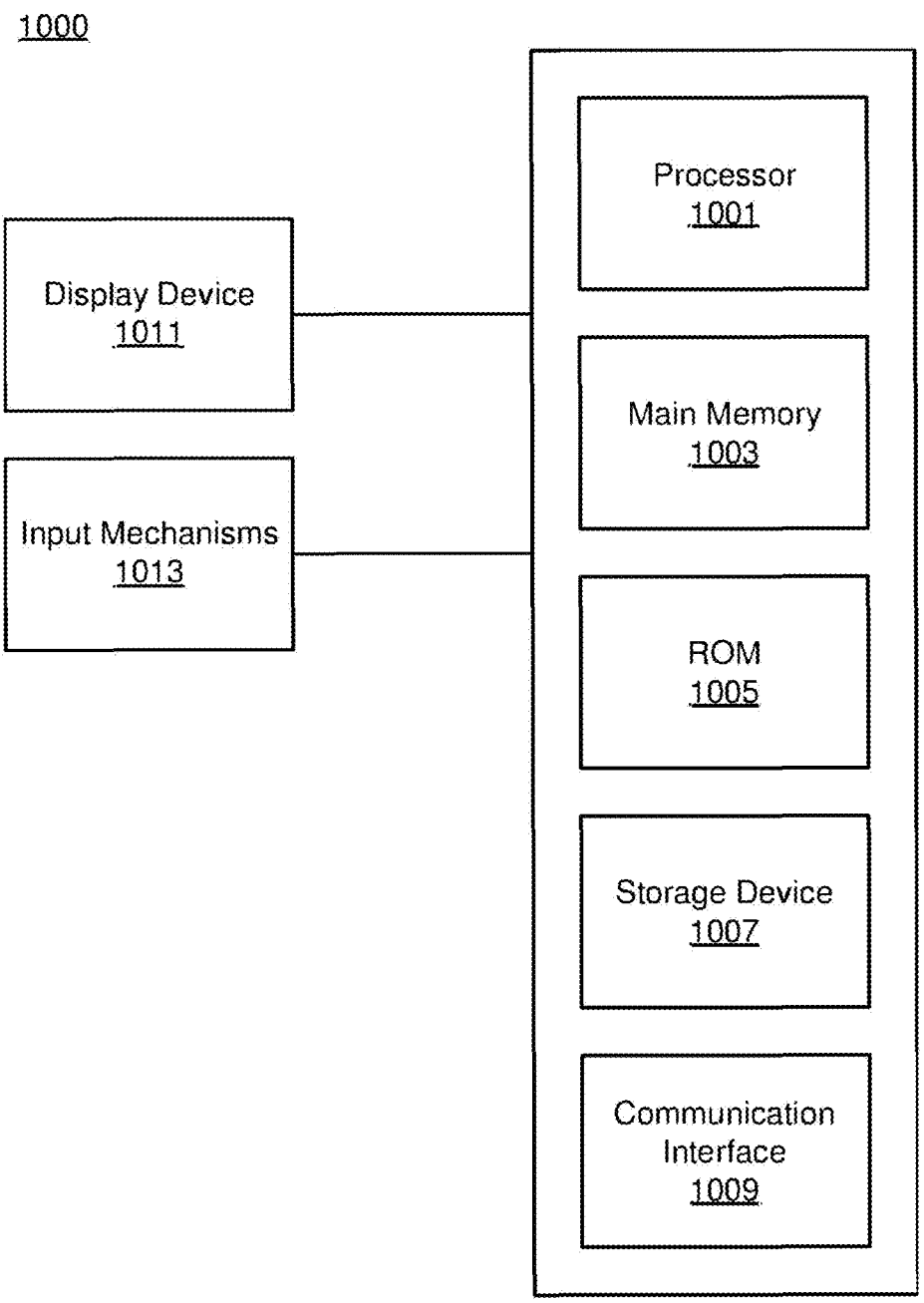
FIG. 10 is a block diagram illustrating a computer system 1000 upon which embodiments described herein may be implemented, according to one embodiment.

FIG. 10 is a block diagram illustrating a computer system 1000 upon which embodiments described herein may be implemented. For example, in the context of FIG. 1, the customer device, the factory server 120, and the factory client 125 may be implemented using the computer system 1000 as described in FIG. 10. The customer device 120, the factory server 120, and/or the factory client 125 may also be implemented using a combination of multiple computer systems 1000 as described in FIG. 10. The computer system 1000 may be, for example, a laptop computer, a desktop computer, a tablet computer, or a smartphone.

In one implementation, the system 1000 includes processing resources 1001, main memory 1003, read only memory (ROM) 1005, storage device 1007, and a communication interface 1009. The system 1000 includes at least one processor 1001 for processing information and a main memory 1003, such as a random access memory (RAM) or other dynamic storage device, for storing information and instructions to be executed by the processor 1001. Main memory 1003 also may be used for storing temporary variables or other intermediate information during execution of instructions to be executed by processor 1001. The system 1000 may also include ROM 1005 or other static storage device for storing static information and instructions for processor 1001. The storage device 1007, such as a magnetic disk or optical disk, is provided for storing information and instructions.

The communication interface 1009 can enable system 1000 to communicate with one or more networks (e.g., the network 140) through use of the network link (wireless or wireline). Using the network link, the system 1000 can communicate with one or more computing devices, and one or more servers. The system 1000 can also include a display device 1011, such as a cathode ray tube (CRT), an LCD monitor, or a television set, for example, for displaying graphics and information to a user. An input mechanism 1013, such as a keyboard that includes alphanumeric keys and other keys, can be coupled to the system 1000 for communicating information and command selections to processor 1001. Other non-limiting, illustrative examples of input mechanisms 1013 include a mouse, a trackball, touch-sensitive screen, or cursor direction keys for communicating direction information and command selections to processor 1001 and for controlling cursor movement on display device 1011. Additional examples of input mechanisms 1013 include a radio-frequency identification (RFID) reader, a barcode reader, a three-dimensional scanner, and a three-dimensional camera.

Examples described herein are related to the use of the factory server 100 for implementing the techniques described herein. According to one embodiment, those techniques are performed by the system 1000 in response to processor 1001 executing one or more sequences of one or more instructions contained in main memory 1003. Such instructions may be read into main memory 1003 from another machine-readable medium, such as storage device 1007. Execution of the sequences of instructions contained in main memory 1003 causes processor 1001 to perform the process steps described herein. In alternative implementations, hard-wired circuitry may be used in place of or in combination with software instructions to implement examples described herein. Thus, the examples described are not limited to any specific combination of hardware circuitry and software.

Additional Configuration Considerations

As used herein, the term "includes" followed by one or more elements does not exclude the presence of one or more additional elements. The term "or" should be construed as a non-exclusive "or" (e.g., "A or B" may refer to "A," "B," or "A and B") rather than an exclusive "or." The articles "a" or "an" refer to one or more instances of the following element unless a single instance is clearly specified.

The drawings and written description describe example embodiments of the present disclosure and should not be construed as enumerating essential features of the present disclosure. The scope of the invention should be construed from any claims issuing in a patent containing this description.

What is claimed is:

1. A method for generating parameters of a part to be fabricated, the method comprising:
   receiving a design request for a part to be fabricated by a fabrication process, wherein the design request includes descriptive information of the part to the fabricated, wherein the descriptive information includes an audio file, and wherein the design request includes a manufacturing tool selected from a plurality of manufacturing tools;
   generating a three-dimensional (3D) model file as a function of the descriptive information, wherein the 3D model file is generated using speech-to-text processing;
   determining a measure of similarity for the 3D model file and selecting one or more model files based on their respective measures of similarity;

ranking the model files according to their respective measures of similarity and selecting model files having a ranking higher than a threshold ranking determining an orientation on a build plate for fabricating the part to be fabricated, wherein determining an orientation comprises selecting an orientation to maximize the number of instances of the part to be fabricated that a printer can print simultaneously;

generating, as a function of the 3D model file and the selected manufacturing tool, a plurality of fabrication parameters-for the part to be fabricated, wherein the fabrication parameters include a cost, a time, and the selected manufacturing tool to fabricate the part to be fabricated; and sending the plurality of fabrication parameters to the customer.

2. The method of claim 1, wherein the descriptive information comprises a number of instances of the part to be manufactured.

3. The method of claim 1, wherein generating the plurality of fabrication parameters comprises using one or more machine-learning modules, wherein the one or more machine-learning modules are configured to:
determine, as a function of a first and a second extracted features, a plurality of fabrication methods associated with a part to be fabricated; and
determine, for each of the fabrication methods of the plurality of fabrication methods, a respective cost associated with the part to be fabricated.

4. The method of claim 1, wherein generating the plurality of fabrication parameters comprises using one or more machine-learning modules, wherein the one or more machine-learning modules are configured to:
receive a plurality of fabrication methods associated with a part to be fabricated;
score each fabrication method of the plurality of fabrication methods;
select, as a function of the scores for each fabrication method of the plurality of fabrication methods, a fabrication method from the plurality of fabrication methods; and
send, to the customer, the selected fabrication method.

5. The method of claim 1, wherein a parameter of the plurality of fabrication parameters of the part to be fabricated is associated with at least an anticipated fabricating tool.

6. A system for generating fabrication parameters for fabrication of a part to be fabricated, the system comprising:
a computing device, the computing device configured to:
receive, from a customer device associated with a customer, a design request for a part to be fabricated by a fabrication process, the design request includes-descriptive information of the part to the fabricated, wherein the descriptive information includes an audio file, and wherein the design request includes a manufacturing tool selected from a plurality of manufacturing tools;
generate a three-dimensional (3D) model file as a function of the descriptive information, wherein the 3D model file is generated using speech-to-text processing;
determine a measure of similarity for the 3D model file and selecting one or more model files based on their respective measures of similarity;
rank the model files according to their respective measures of similarity and select model files having a ranking higher than a threshold ranking;
determine an orientation on a build plate for fabricating the part to be fabricated, wherein determining an orientation comprises selecting an orientation to maximize the number of instances of the part to be fabricated that a printer can print simultaneously;
select from a plurality of distinct manufacturing tools, a manufacturing tool; and
generate, as a function of the 3D model file and the selected manufacturing tool, a plurality of fabrication parameters for the part to be fabricated, wherein the fabrication parameters include a cost, a time, and the selected manufacturing tool to fabricate the part to be fabricated; and;
send the plurality of fabrication parameters to the customer.

7. The system of claim 6, wherein the descriptive information comprises a number of instances of the part to be manufactured.

8. The system of claim 6, further comprising one or more machine-learning modules operating on the computing device, wherein the one or more machine-learning modules is configured to:
determine, as a function of a first and a second extracted features, a plurality of fabrication methods associated with a part to be fabricated; and
determine, for each of the fabrication methods of the plurality of fabrication methods, a respective cost associated with the part to be fabricated.

9. The system of claim 6, further comprising one or more machine-learning modules operating on the computing device, wherein the one or more machine-learning modules are configured to:
receive a plurality of fabrication methods associated with a part to be fabricated;
score each fabrication method of the plurality of fabrication methods;
select, as a function of the scores for each fabrication method of the plurality of fabrication methods, a fabrication method from the plurality of fabrication methods; and
send, to the customer, the selected fabrication method.

10. The system of claim 6, wherein a parameter of the plurality of fabrication parameters of the part to be fabricated is associated with at least an anticipated fabricating tool.

11. The method of claim 1, wherein the audio file is included in a video file.

12. The method of claim 1, further comprising identifying from a plurality of 3D models in a model file library, at least a 3D model as a function of descriptive feature, wherein the plurality of 3D models further comprises at least a model feature associated with each 3D model of the plurality of 3D models.

13. The method of claim 1, further comprising:
receiving, as a function of the design request, at least one mechanical requirement, wherein the mechanical requirement corresponds to the use of the part to be fabricated; and
selecting a part orientation as a function of the mechanical requirement.

14. The method of claim 1, further comprising:
determining at least one keyword from the design request using natural language processing; and
identifying at least one structure as a function of the at least one keyword using a machine-learning model.

15. The method of claim 14, wherein the machine-learning model includes a decision tree, a neural network, or a logistic classifier.

16. The system of claim 6, wherein the audio file is included in a video file.

17. The system of claim 6, wherein the computing device is further configured to identify from a plurality of 3D models in a model file library, at least a 3D model as a function of a descriptive feature, wherein the plurality of 3D models further comprises at least a model feature associated with each 3D model of the plurality of 3D models.

18. The system of claim 6, wherein the computing device is further configured to:
- receive, as a function of the design request, at least one mechanical requirement, wherein the mechanical requirement corresponds to the use of the part to be fabricated; and
- select a part orientation as a function of the mechanical requirement.

19. The system of claim 6, wherein the computing device is further configured to:
- determine at least one keyword from the design request using natural language processing; and
- identify at least one structure as a function of the at least one keyword using a machine-learning model.

20. The system of claim 19, wherein the machine-learning model includes a decision tree, a neural network, or a logistic classifier.

* * * * *